US007345783B2

(12) United States Patent
Suzuki et al.

(10) Patent No.: US 7,345,783 B2
(45) Date of Patent: Mar. 18, 2008

(54) IMAGE PROCESSING METHOD AND APPARATUS FOR GENERATING SEQUENTIAL STILL IMAGES BY EXTRACTING STILL IMAGES FROM MOVING IMAGE DATA, AND PRINTING APPARATUS

(75) Inventors: Takayuki Suzuki, Kanagawa (JP); Tetsu Kaneko, Kanagawa (JP); Yasushi Mochizuki, Kanagawa (JP); Tatsuya Hisatomi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 855 days.

(21) Appl. No.: 10/282,786

(22) Filed: Oct. 29, 2002

(65) Prior Publication Data

US 2003/0081260 A1 May 1, 2003

(30) Foreign Application Priority Data

Oct. 31, 2001 (JP) ............................. 2001-335186
Oct. 31, 2001 (JP) ............................. 2001-335187

(51) Int. Cl.
*G06K 15/00* (2006.01)

(52) U.S. Cl. ................... 358/1.18; 358/1.12; 358/1.15; 358/1.17; 345/473; 345/474; 345/475

(58) Field of Classification Search ............... 358/1.17, 358/1.15, 1.18, 1.12; 717/109; 345/473, 345/474, 475; 348/578; 725/93; 382/107
See application file for complete search history.

(56) References Cited

U.S. PATENT DOCUMENTS

| 5,613,048 | A | * | 3/1997 | Chen et al. .................. 345/419 |
| 5,706,097 | A | * | 1/1998 | Schelling et al. ........... 358/296 |
| 6,167,562 | A | * | 12/2000 | Kaneko ....................... 717/109 |
| 6,549,207 | B1 | * | 4/2003 | Matsumoto .................. 345/473 |
| 6,561,907 | B2 | * | 5/2003 | Shimizu et al. ............... 463/31 |
| 6,618,491 | B1 | * | 9/2003 | Abe ........................... 382/107 |
| 6,700,578 | B2 | | 3/2004 | Kamata et al. |
| 6,910,221 | B1 | * | 6/2005 | Honda .......................... 725/93 |
| 6,957,389 | B2 | * | 10/2005 | Faraday et al. ............. 715/731 |
| 2002/0135808 | A1 | * | 9/2002 | Parry ......................... 358/1.17 |

FOREIGN PATENT DOCUMENTS

| JP | A 05-183863 | 7/1993 |
| JP | A 06-334954 | 12/1994 |
| JP | A 10-327376 | 12/1998 |
| JP | A 2000-224526 | 8/2000 |
| JP | A 2000-253309 | 9/2000 |
| JP | A 2001-111919 | 4/2001 |
| JP | A 2001-223876 | 8/2001 |

* cited by examiner

*Primary Examiner*—King Y. Poon
*Assistant Examiner*—Vincent Rudolph
(74) *Attorney, Agent, or Firm*—Gowan, Liebowitz & Latman, P.C.

(57) ABSTRACT

An image processing apparatus controls to print a plurality of sequential still images, which can be observed as a flip moving image, on the basis of moving image data. The image processing apparatus provides a window which has a start point button, end point button, seek bar, and the like. The user designates a desired still image extraction range from the moving image data by operating the start and end point buttons. This window also provides a preview button. When the user clicks the preview button, a predetermined number of sequential still images are generated from the designated still image extraction range in the moving image. These sequential still images are displayed while being sequentially switched in the order they appear in the moving image data.

8 Claims, 28 Drawing Sheets

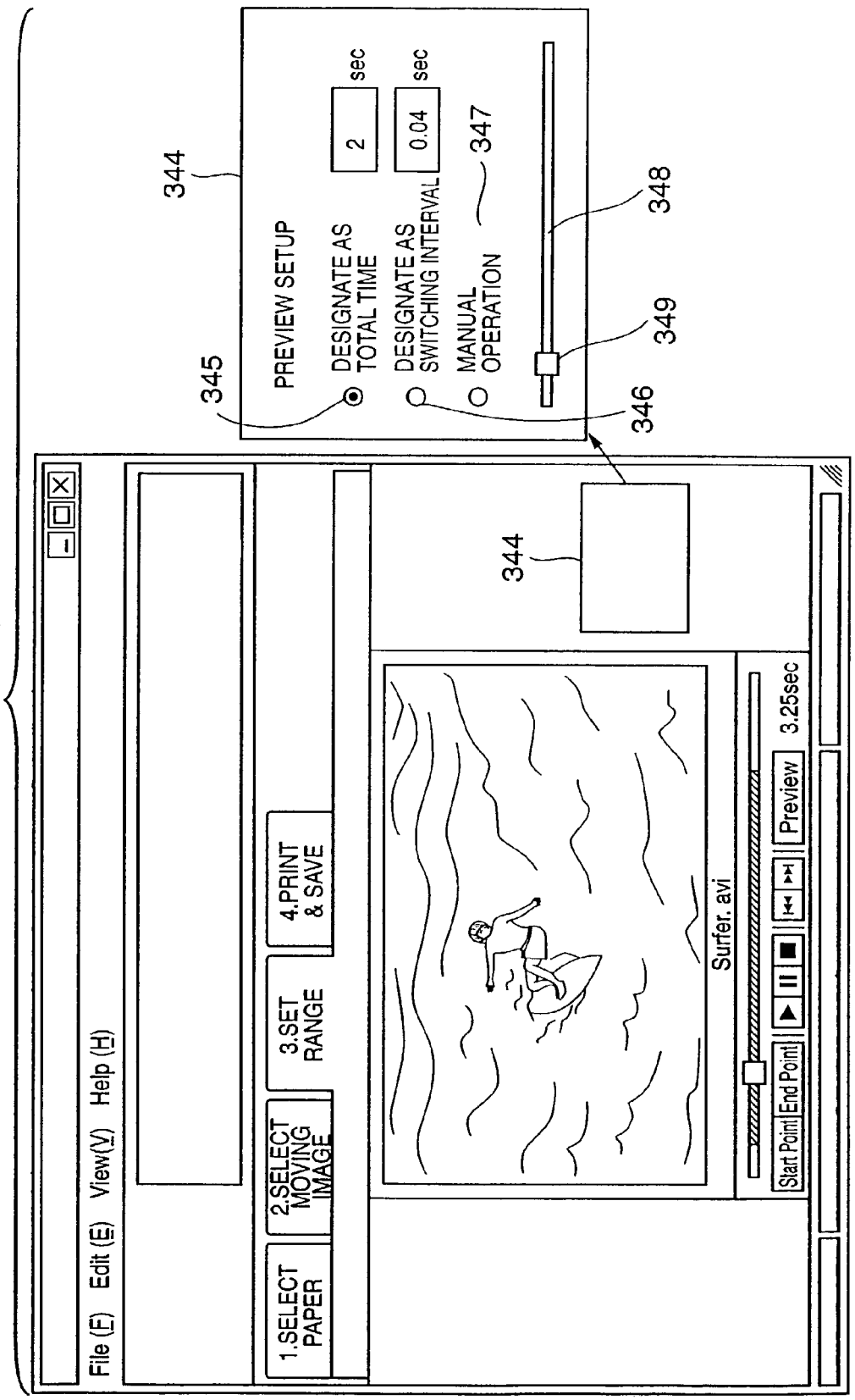

FIRST SHEET SET

SECOND SHEET SET

FIG. 14
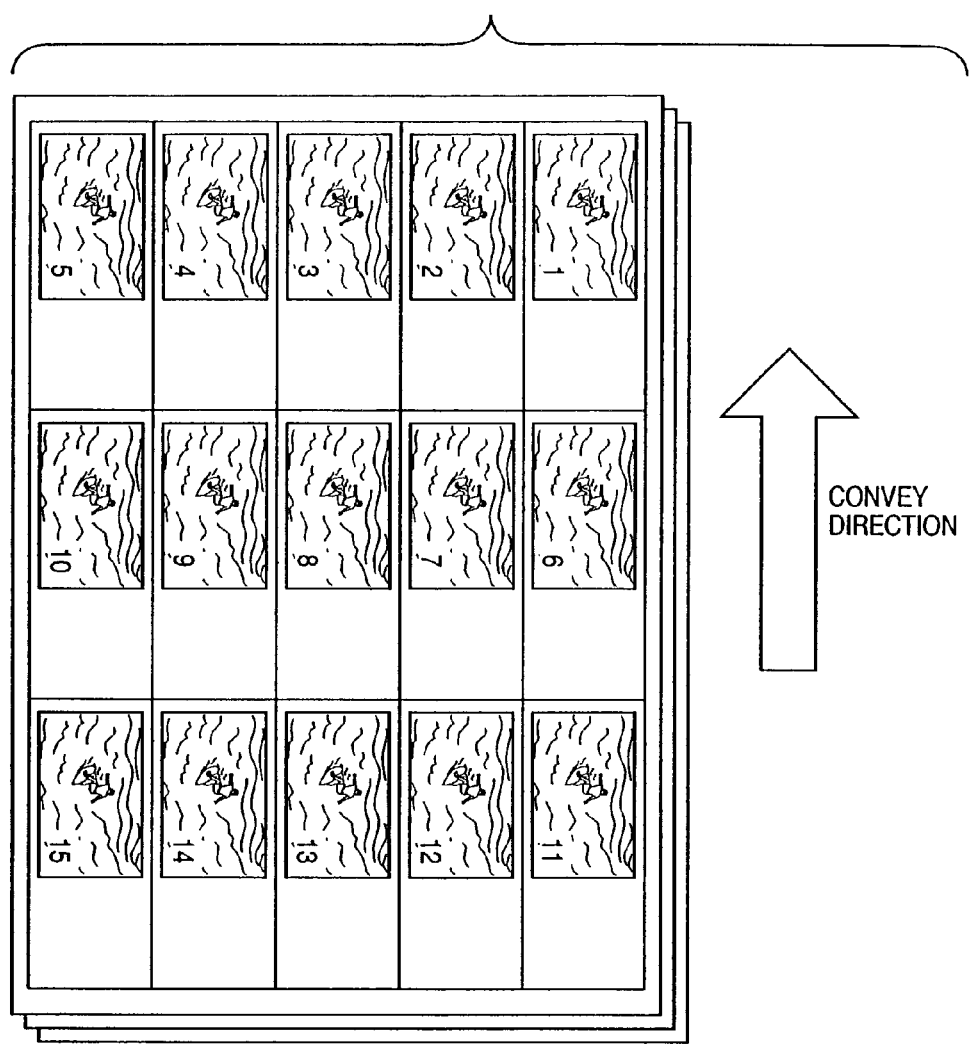
CONVEY DIRECTION
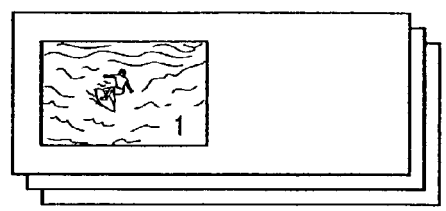
FOR LEFT-HANDED USER

FIG. 15
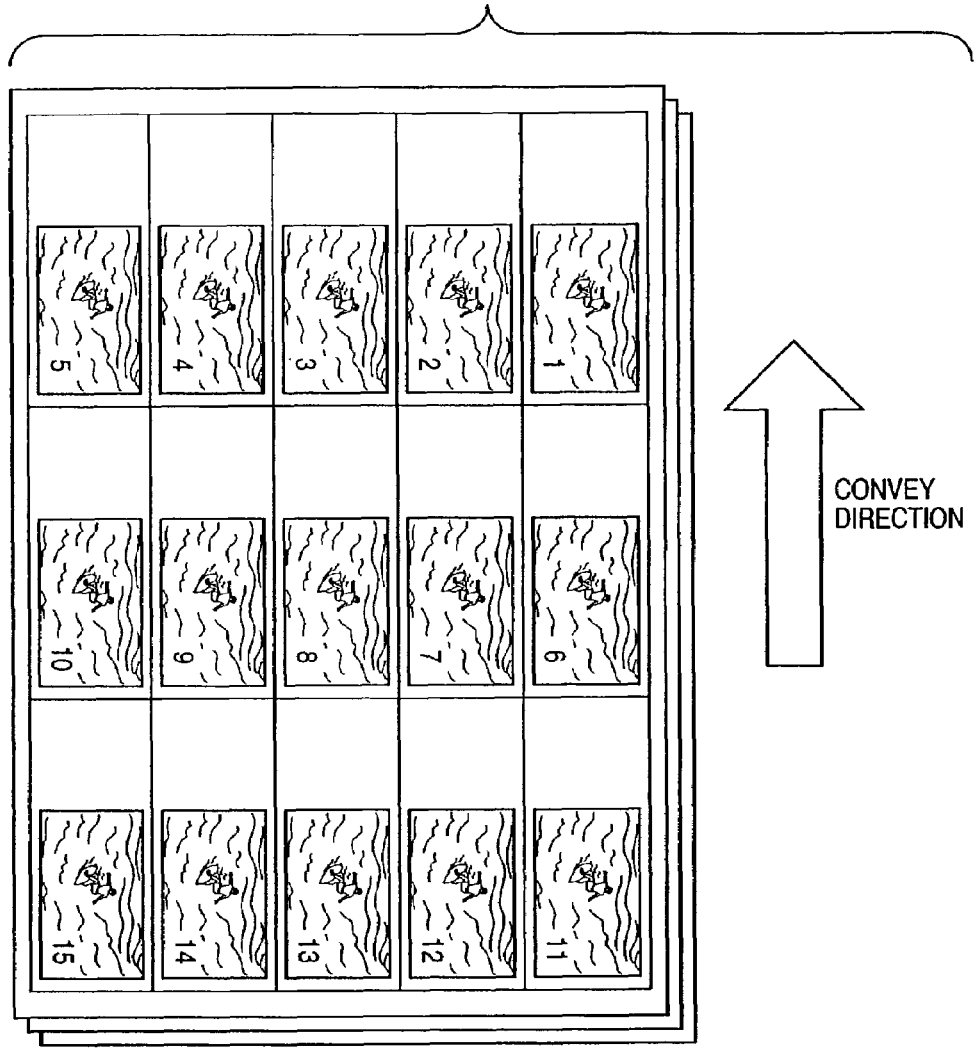
CONVEY DIRECTION
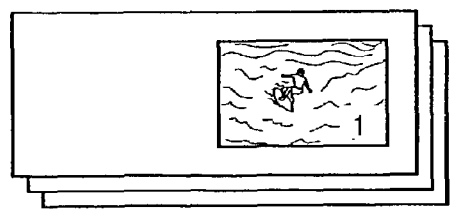
FOR RIGHT-HANDED USER

FIG. 16
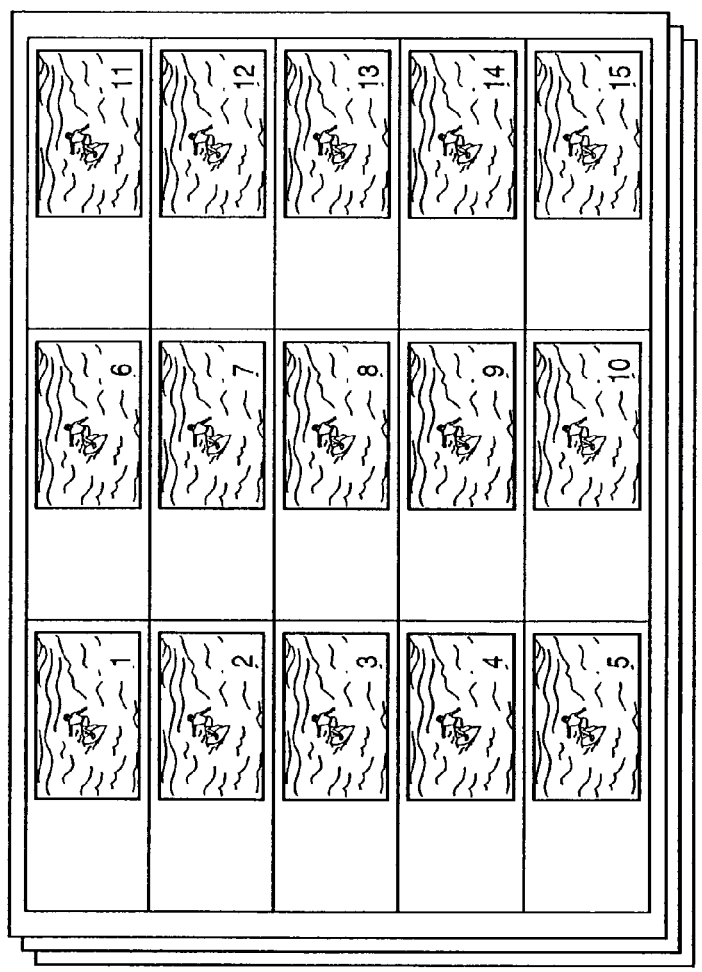
CONVEY DIRECTION
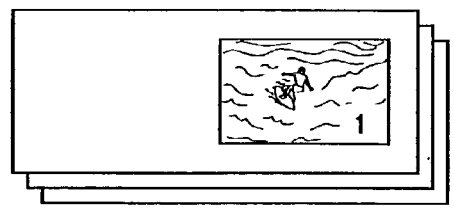
FOR RIGHT-HANDED USER

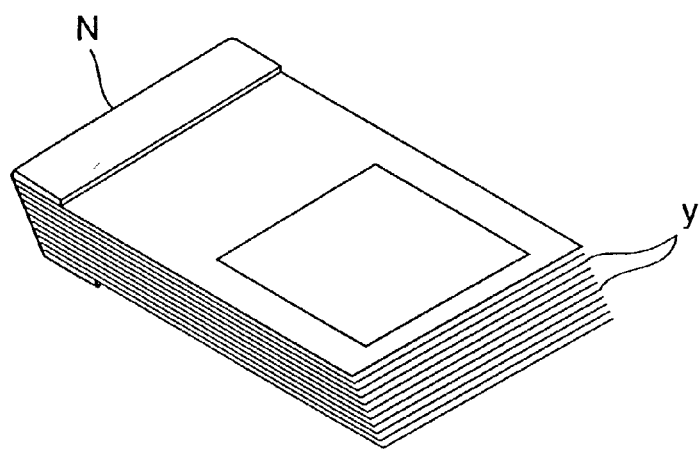
F I G. 26A
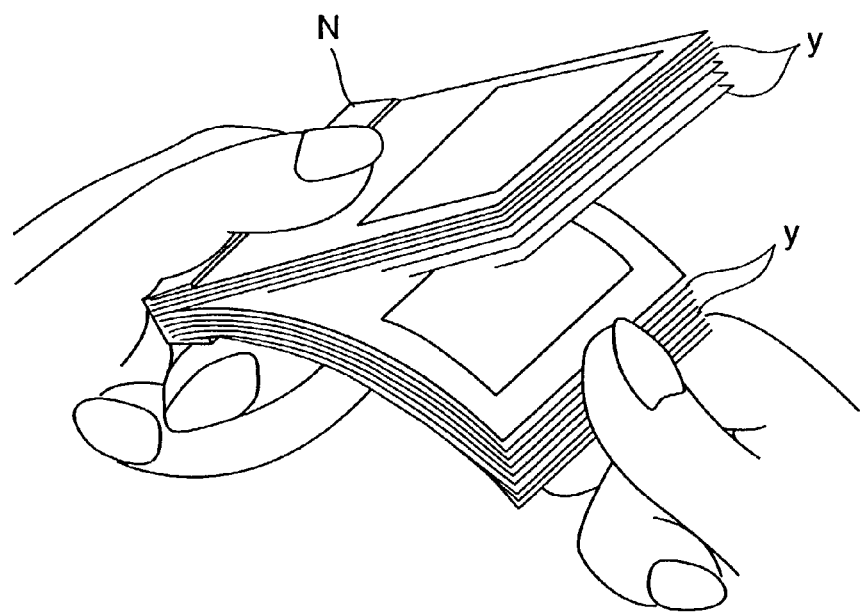
F I G. 26B

IMAGE PROCESSING METHOD AND APPARATUS FOR GENERATING SEQUENTIAL STILL IMAGES BY EXTRACTING STILL IMAGES FROM MOVING IMAGE DATA, AND PRINTING APPARATUS

FIELD OF THE INVENTION

The present invention relates to an image processing method and apparatus, and a printing apparatus for printing out a plurality of images obtained from moving image data.

BACKGROUND OF THE INVENTION

An apparatus that prints a sequential motion of an object as a plurality of images has been proposed. As an example of an apparatus of this type, an apparatus described in, e.g., Japanese Patent Laid-Open No. 10-327376 is known.

According to Japanese Patent Laid-Open No. 10-327376, a predetermined number of captured images are obtained and stored from a video camera output from an image capture start instruction until an elapse of a pre-set image capture time, and are printed out, as shown in FIG. 25. On this printout, blank spaces are formed aside respective captured images, and can be used as binding margins, as shown in FIG. 26A. The user can observe the captured images like a moving image by successively flipping a bundle of printouts, as shown in FIG. 26B. Such moving image will be referred to as a "flip moving image" hereinafter. Successive still images that can provide a flip moving image will be referred to as sequential still images hereinafter.

On the other hand, the position of the blank space portion on each printout in FIG. 25 can be selected from the left or right side of a captured image to cope with right- and left-handed users. More specifically, when the user designates to form a blank space portion on the left side of a captured image, a printout for a right-handed user (left binding) can be obtained; when the user designates to form a blank space portion on the right side of a captured image, a printout for a left-handed user (right binding) can be obtained.

In general, in an apparatus of this type, captured images are extracted from the whole range from the beginning to the end of image capture, and are stored to output sequential still images. According to the Japanese Patent Laid-Open No. 10-327376 above, when the user designates a desired one of image capture times of 8 sec, 10 sec, and 12 sec, an image is captured during the designated image capture time, and captured images are stored at given intervals during that image capture process. For example, if the user designates 8 sec, captured images are stored at every ⅙ sec to store 48 captured images; if the user designates 10 sec, captured images are stored at every ⅕ sec to store 48 captured images.

However, although the user designates, e.g., the image capture time of 10 sec, if a portion of his or her interest corresponds to a portion from 2 sec to 9 sec, captured images contained in the first and last 1-sec intervals become useless printouts. Also, Japanese Patent Laid-Open No. 2001-223876 contains only a description "an object image may be captured as a moving image, and frames may be extracted from the moving image at given time intervals".

As described above, in the prior art, since images are merely extracted from the whole captured moving image sequence, printouts that can flexibly cope with user's interest cannot be obtained.

Japanese Patent Laid-Open No. 10-327376 describes sequential display of captured images which are extracted and stored from the whole range from the beginning to the end of image capture for the purpose of confirmation by the user, i.e., a preview function. However, since sequential still images are extracted from the whole captured moving image sequence, if the user is dissatisfied with the extracted contents as a result of preview, he or she must redo the image capture process from the beginning.

Since Japanese Patent Laid-Open Nos. 10-327376 and 2001-223876 do no consider a case wherein a desired designated range is too short to generate a predetermined number of sequential still images, since setting of a desired designated range of a moving image set as an extraction range is not assumed.

SUMMARY OF THE INVENTION

The present invention has been made in consideration of the above situation, and has as its object to obtain sequential still images by extracting a predetermined number of images from a desired range in a moving image at given intervals, and to allow the user to preview a flip moving image by sequentially displaying the obtained sequential still images prior to printout, thus flexibly meeting user's requirements.

It is another object of the present invention to allow the user to immediately re-set a desired range in a moving image after the obtain sequential still images are sequentially displayed, so as to improve the operability.

It is still another object of the present invention to allow to acquire a predetermined number of sequential still images irrespective of the length of a desired designated range upon obtaining the predetermined number of sequential still images from a desired range in a moving image.

According to the present invention, the foregoing object is attained by providing an image processing apparatus for controlling to print a plurality of sequential still images, which can be observed as a flip moving image, on the basis of moving image data, comprising:

designation means for designating a desired range of the moving image data;

generation means for generating a predetermined number of sequential still images using frames within the desired range of the moving image data; and display control means for controlling to display the predetermined number of sequential still images generated by the generation means while sequentially switching the sequential still images in an order they appear in the moving image data.

In another aspect of the present invention, an image processing method for controlling to print a plurality of sequential still images, which can be observed as a flip moving image, on the basis of moving image data is provided, wherein the image processing method comprises:

the designation step of designating a desired range of the moving image data;

the generation step of generating a predetermined number of sequential still images using frames within the desired range of the moving image data; and the display control step of controlling to display the predetermined number of sequential still images generated in the generation step while sequentially switching the sequential still images in an order they appear in the moving image data.

In still another aspect of the present invention, an image processing apparatus for controlling to print a plurality of sequential still images, which can be observed as a flip moving image, on the basis of moving image data is provided, wherein the image processing apparatus comprises:

designation means for designating a desired range of the moving image data;

checking means for checking if a predetermined number of frames can be extracted from the desired range of the moving image data;

first generation means for, when the checking means determines that the predetermined number of frames can be extracted, generating a predetermined number of sequential still images by extracting the predetermined number of frames from the desired range; and second generation means for, when the checking means determines that the predetermined number of frames cannot be extracted, generating sequential still images by extracting a largest possible number of frames from the desired range, and generating the predetermined number of sequential still images by complementing deficient frames by repetitively using identical frames.

In another aspect of the present invention, an image processing method for controlling to print a plurality of sequential still images, which can be observed as a flip moving image, on the basis of moving image data is provided, wherein the image processing method comprises:

the designation step of designating a desired range of the moving image data;

the checking step of checking if a predetermined number of frames can be extracted from the desired range of the moving image data;

the first generation step of generating, when it is determined in the checking step that the predetermined number of frames can be extracted, a predetermined number of sequential still images by extracting the predetermined number of frames from the desired range; and the second generation step of generating, when it is determined in the checking step that the predetermined number of frames cannot be extracted, sequential still images by extracting a largest possible number of frames from the desired range, and generating the predetermined number of sequential still images by complementing deficient frames by repetitively using identical frames.

In still another aspect of the present invention, a printing apparatus including the above image processing apparatus is provided.

In still another aspect of the present invention, a computer readable memory which stores computer program for performing the above image processing methods, is provided.

In still another aspect of the present invention, a computer executable program for performing the above image processing methods, is provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9B shows a preview operation interface in the range setup window;

FIG. 14 is a view for explaining a right-binding print layout according to the embodiment of the present invention;

FIG. 15 is a view for explaining a problem posed upon adopting a left-binding print layout;

FIG. 16 is a view for explaining a left-binding print layout according to the embodiment of the present invention;

FIGS. 26A and 26B show a state wherein the user observes a flip moving image using the strip sheets obtained from the printout shown in FIG. 25.

DETAILED DESCRIPTION OF THE PREFERRED EMBODIMENTS

Preferred embodiments of the present invention will now be described in detail in accordance with the accompanying drawings.

[System Arrangement]

Figure 1:
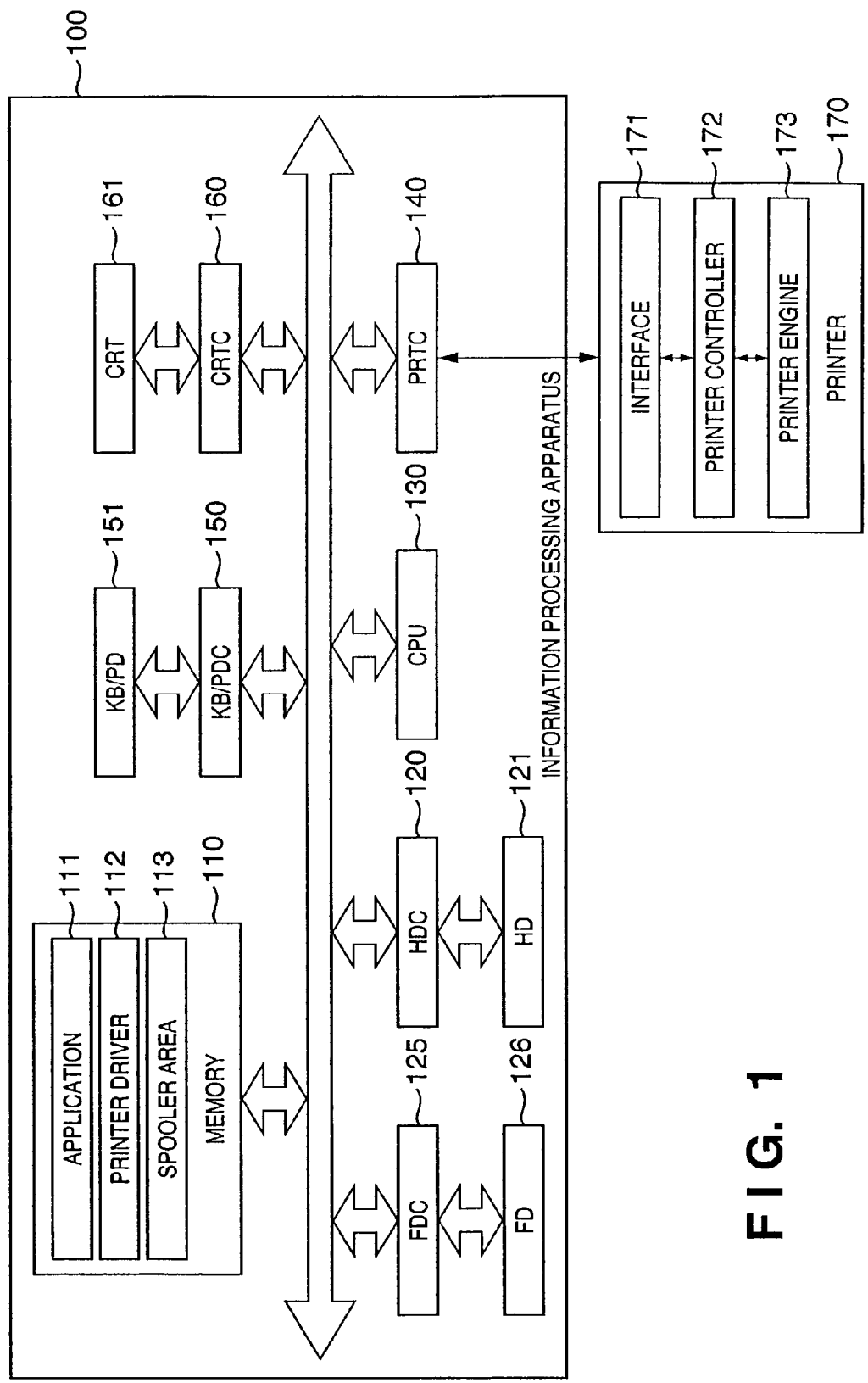
FIG. 1 is a block diagram showing the arrangement of an image forming system according to an embodiment of the present invention.

FIG. 1 is a block diagram showing the arrangement of an image forming system according to this embodiment. The image forming system of this embodiment comprises an information processing apparatus 100 for generating print data (containing control commands), and a printer 170 for forming an image on the basis of the print data.

The information processing apparatus 100 comprises a memory 110, a CPU 130, a hard disk controller (HDC) 120 and hard disk (HD) 121 connected to it, a floppy disk controller (FDC) 125 and floppy disk drive (FD) 126 connected to it, a printer controller (PRTC) 140, a keyboard/pointing device controller (KB/PDC) 150 and keyboard (KB)/pointing device (PD) 151 connected to it, and a CRT controller (CRTC) 160 and CRT 161 connected to it.

Note that a mouse is used as the pointing device (PD) in this embodiment, but various other devices such as a track ball, touch panel, and the like may be used. In the above arrangement, the CRT 161 is used as a display, but other types of displays such as a liquid crystal display, plasma display, and the like may be used.

The memory 110 has an application 111 that controls an image edit process in the present invention, a printer driver 112 as software for generating print data compatible to the printer 170, a spooler area 113 for spooling print data to be supplied to the printer 170, an OS (operating system; not shown), a work area (not shown), and the like.

The CPU 130 operates on the basis of the application 111, printer driver 112, OS, and the like in the memory 110. Upon power ON, the apparatus is booted by a boot program stored in a ROM (not shown), and the OS program is loaded from the HD 121 onto the memory 110 to launch the OS. After that, the application program is similarly loaded and executed under the management of the OS, thus making the apparatus function as the image forming system. As a matter of course, the CPU 130 can access the HD 121 via the HDC 120.

The PRTC 140 executes a process for sequentially transmitting print data stored in the spooler area 113 to the printer 170. More specifically, the PRTC 140 is implemented by a Centronics or USB interface and its communication controller. The KB/PDC 150 controls the KB/PD 151, and fetches instruction data from the user input using the keyboard or mouse into the apparatus. The CRTC 160 is a controller for controlling the CRT 161 as a display device. These blocks 150, 151, 160, and 161 form a user interface.

On the other hand, the printer 170 comprises an interface 171 for receiving print data from the information processing apparatus 100, and sending various status data to the information processing apparatus 100, a printer controller 172 for mainly interpreting received printer data, and generating bitmap image data, and a printer engine 173 for receiving the bitmap image data output from the printer controller 172 and actually forming an image. Note that the printer 170 comprises a control panel and the like although they are not shown. The printer engine 173 may use any of an ink-jet system, electrophotography system, thermal transfer system, and the like.

In the above arrangement, when the printer 170 is connected to the information processing apparatus 100 for the first time, the printer driver 112 for generating print data compatible to the printer 170 must be installed. Such installation process need only be done only once unless it is specially required.

Figure 2:
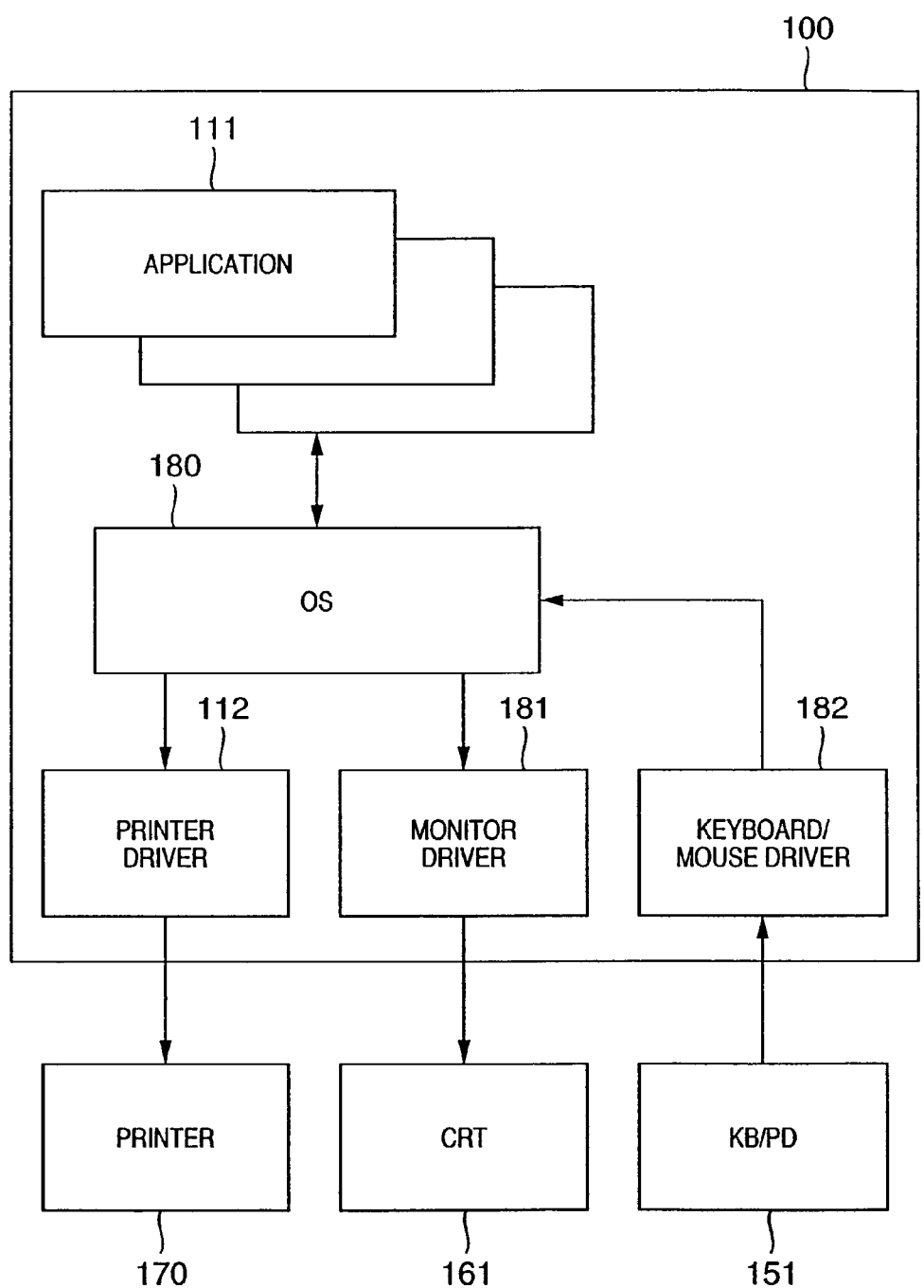
FIG. 2 is a diagram for explaining an information processing apparatus 100 of the image forming system shown in FIG. 1 from the viewpoint of the software configuration.

FIG. 2 is a diagram for explaining the information processing apparatus 100 of the image forming system shown in FIG. 1 from the viewpoint of the software configuration.

The keyboard and mouse (KB/PD) 151 are connected as input devices to the information processing apparatus 100. Also, the printer 170 and the CRT 161 as a monitor are connected as output devices.

An input made using the keyboard or mouse is processed by a keyboard/mouse driver 182, and is passed to an OS 180. The information processing apparatus 100 has application software 111 including a wordprocessor, spreadsheet, Internet browser, and the like. Various rendering process commands (image rendering command, text rendering command, and graphics rendering command) which are issued by the application software 111 and indicate an output image are input to a monitor driver 181 via the OS 180. Upon printing that image, these rendering commands are input to the printer driver 112 via the OS 180. The printer driver 112 is software for processing the rendering commands to generate print data, and making the printer 170 to print the print data, and the monitor driver 181 is software for making the CRT 161 display an image.

Note that a prevalent IBM AT compatible personal computer may be used as the information processing apparatus 100 shown in FIGS. 1 and 2, and Microsoft Windows98® may be used as the OS 180. When the monitor 161, printer 170, and keyboard/mouse 151 are connected to such personal computer to execute a print process application (to be described later), the print system of this embodiment can be implemented.

In the information processing apparatus 100, the application software 111 generates output image data using text data such as characters and the like which are categorized into text, graphics data such as figures and the like which are categorized into graphics, image data which are categorized into photo images and the like, and so forth. Upon printing an image based on the output image data, the application software 111 sends a printout request to the OS 180, and issues rendering commands that contain a text rendering command of text data, a graphics rendering command of graphics data, and an image rendering command of image data, to the OS 180.

Upon receiving the printout request from the application software 111, the OS 180 passes the rendering commands to the printer driver 112 corresponding to the printer 170. The printer driver 112 generates print data that can undergo a print process of the printer 170 by processing the printout request and rendering commands passed from the OS 180, and sends the print data to the printer 170.

When the printer 170 is a raster printer, the printer driver 112 rasterizes the rendering commands on R, G, and B band memories each having an 8-bit depth. After all the rendering commands are rasterized, the contents of the band memories are converted into a data format that the printer 170 can print, e.g., CMYK data, and the converted data are sent to the printer 170. Note that these band memories are assured on, e.g., a RAM (memory 110).

[Print Process Application]

Figure 18:
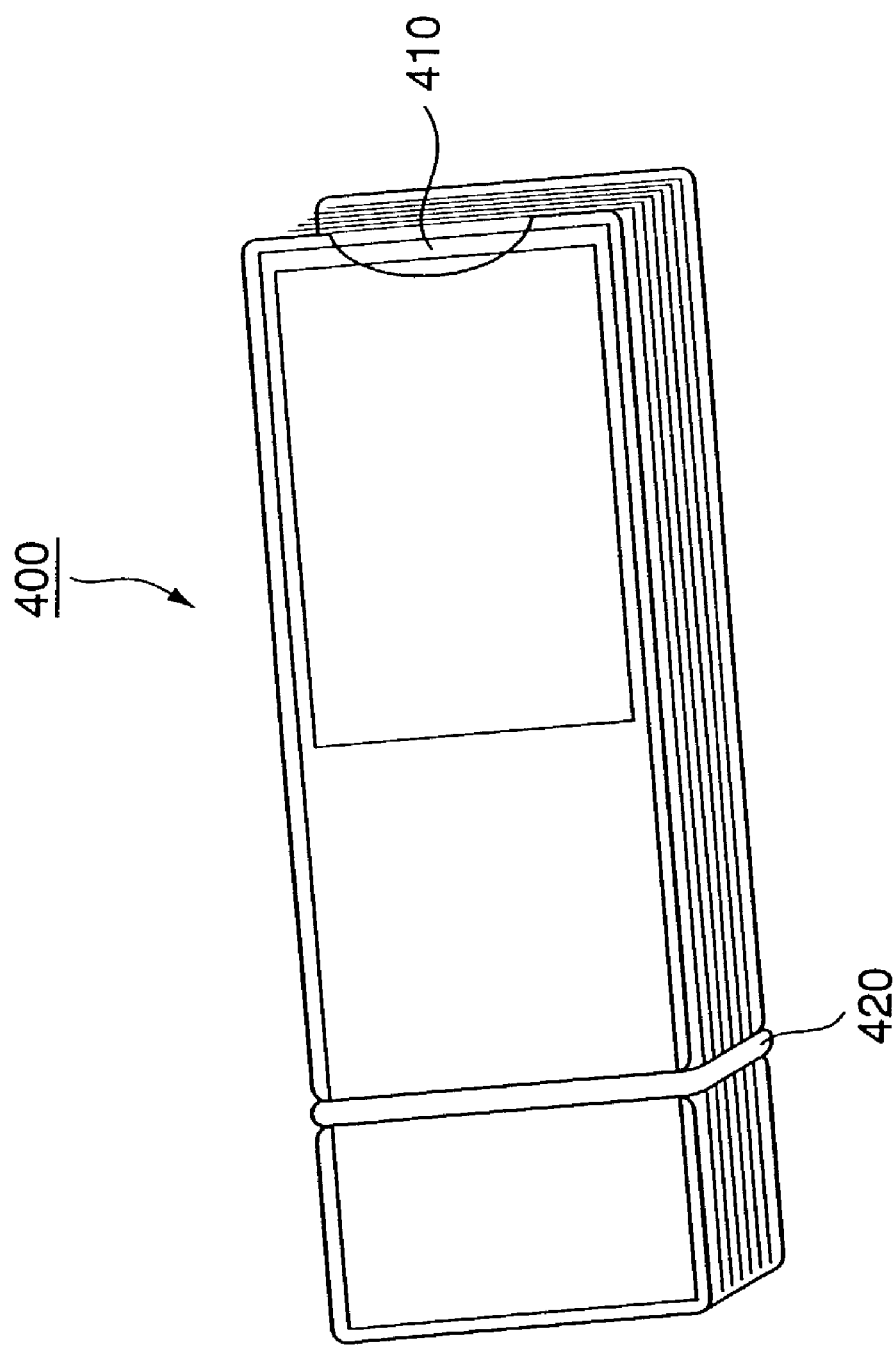
FIG. 18 shows a state wherein strip sheets on which sequential still images are printed are housed in a case according to the embodiment of the present invention.
Figure 19:
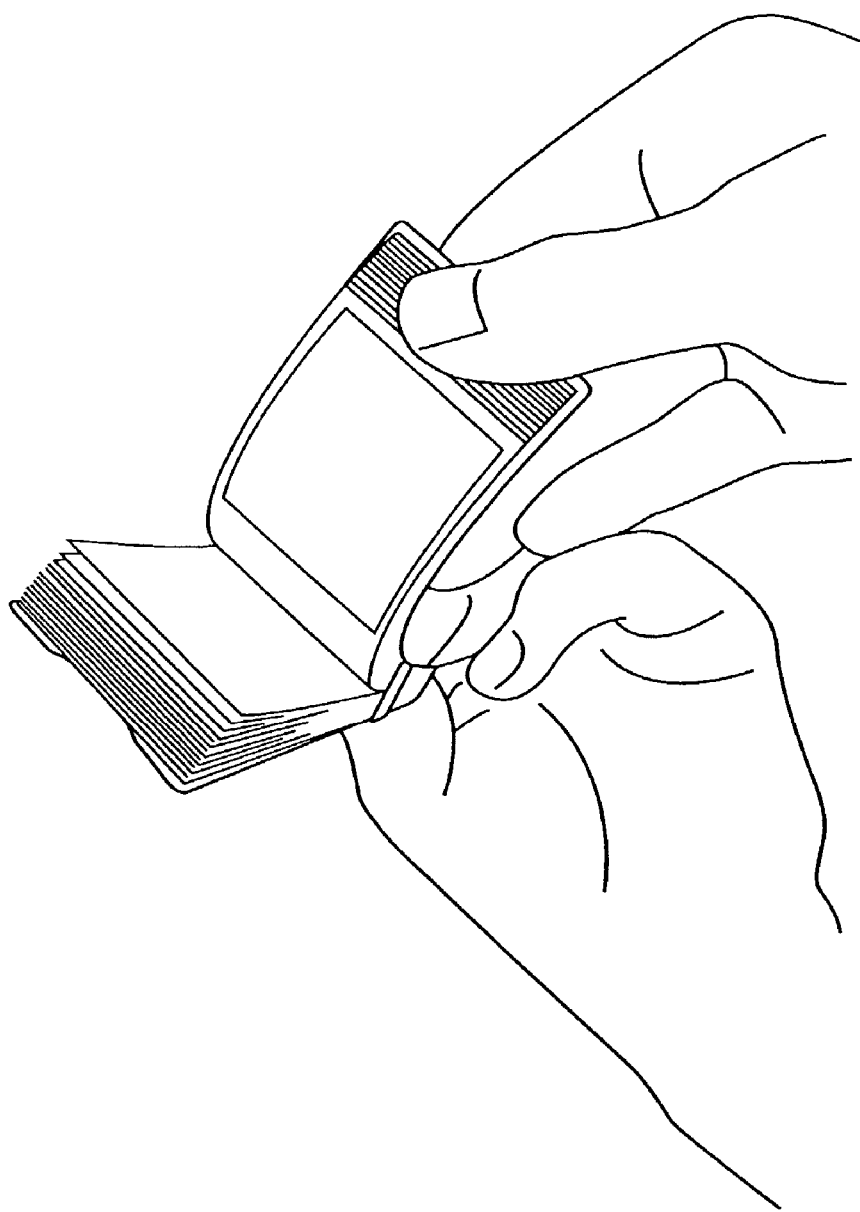
FIG. 19 shows a state wherein the user observes a flip moving image using the strip sheets housed in the case according to the embodiment of the present invention.
Figure 23:
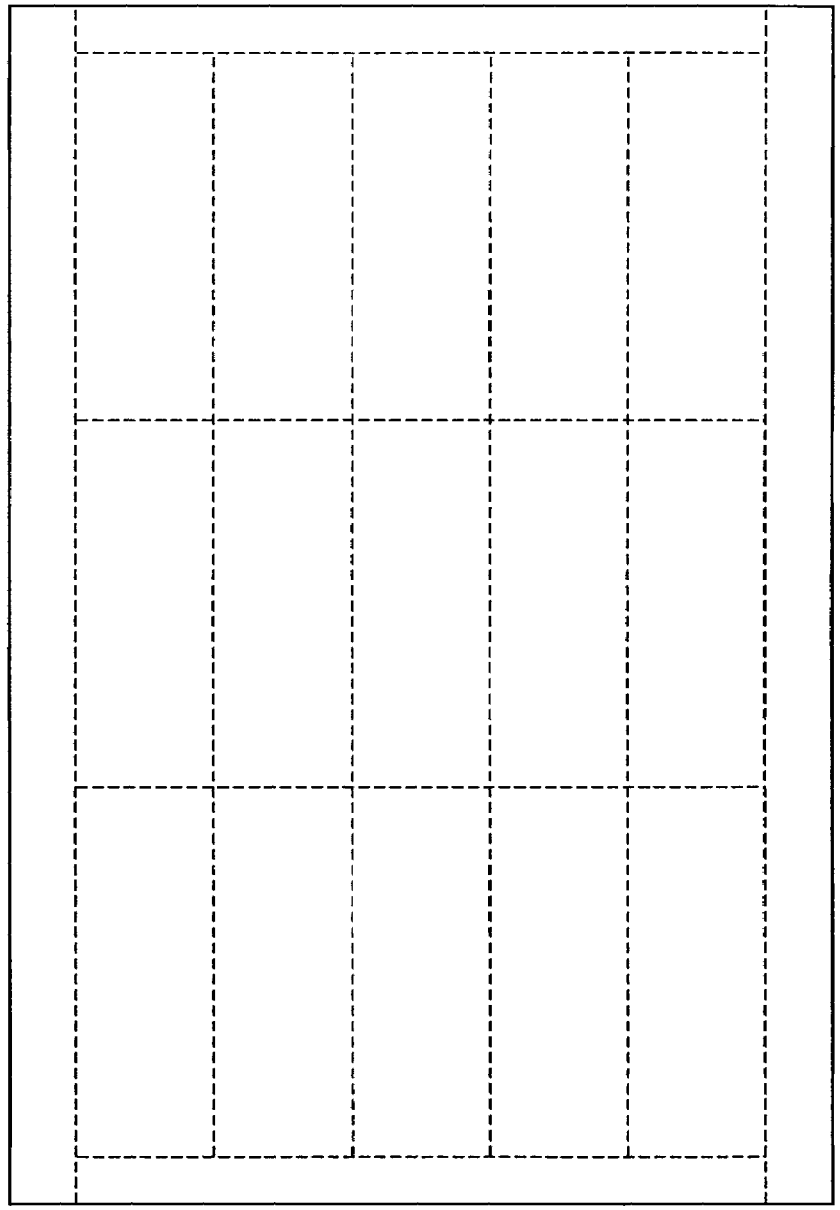
FIG. 23 shows a paper sheet used to print sequential still images in the embodiment of the present invention.

The print process application according to this embodiment, which can run as the application 111, will be explained below. The print process application according to this embodiment extracts a predetermined number of sequential still images from a desired range of moving image data, and prints these sequential images on a perforated paper sheet that can be torn into strip sheets, as shown in FIG. 23. By printing sequential still images to line up sequential still images and blank spaces in the longitudinal direction of the strip sheets, binding margins are formed on the respective strip sheets. When the strip sheets obtained in this manner are bundled, as shown in FIGS. 18 and 19, the user can observe a flip moving image. The operations and functions of the print process application of this embodiment will be described below.

When the print process application of this embodiment is launched, a dedicated application window is displayed. As the application window, a paper select window (see FIG. 7), moving image select window (see FIG. 8), range setup window (see FIG. 9A), and print/save window (see FIG. 10A) are prepared. Note that the paper select window is displayed as a default window upon launching this print application, but the present invention is not limited to this. The respective windows have tabs (301a to 301d) used to select a given window, and a desired one of the windows shown in FIGS. 7 to 10A can be selected by clicking a desired tab.

An outline of the print sequence by this print process application is as follows:
  a printer, paper sheet, and the like to be used are set on the paper select window;
  a desired moving image file is selected on the moving image select window;
  a desired range in the moving image file selected on the moving image select window is set on the range setup window, and it is confirmed using a flip moving image preview function if the set range is appropriate; and
  a predetermined number of sequential still images are generated from the desired range set on the range setup window, and are output by the set printer on the print/save window.

Details of the operations for the respective windows will be explained below.

Figure 3:
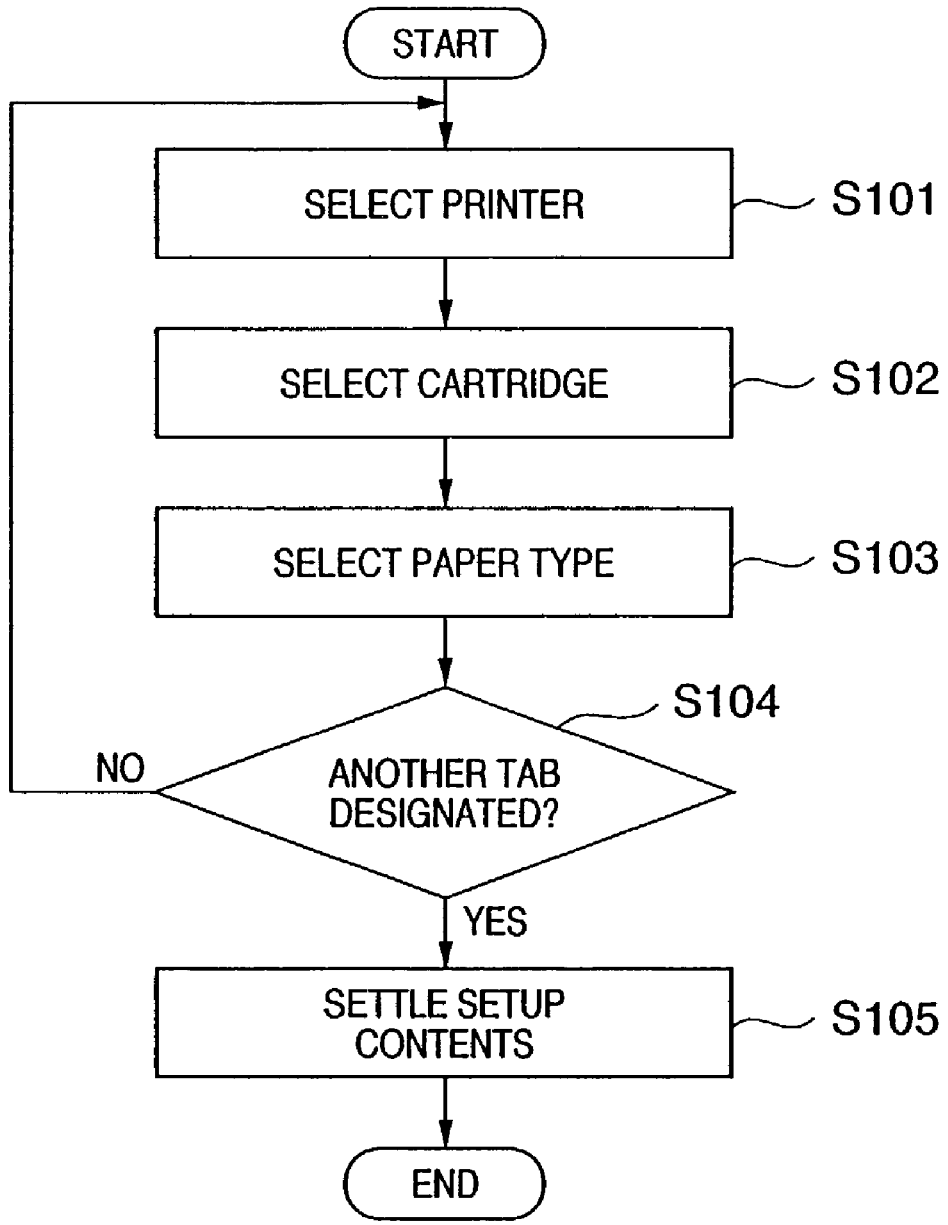
FIG. 3 is a flow chart for explaining the process executed when a paper select window is selected.
Figure 7:
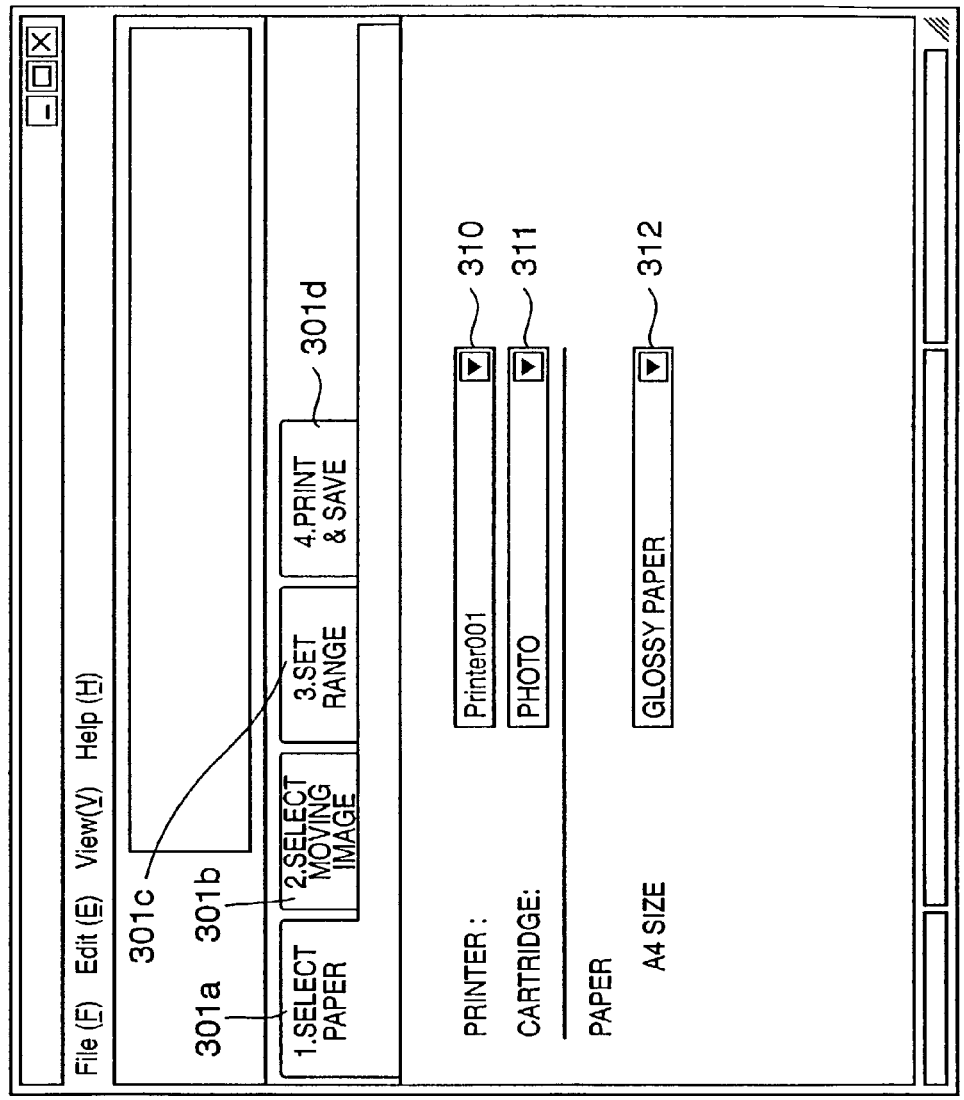
FIG. 7 shows a display example of the paper select window.

A paper select process executed by displaying the paper select window will be explained first with reference to FIGS. 3 and 7. FIG. 3 is a flow chart for explaining the process executed when the paper select window shown in FIG. 7 is selected.

In step S101, the names of printers to be selected are input to a box 310 to prompt the user to select a printer. By clicking a ∇ button on the right side of the box 310, a list of available printers is displayed, and the user can select a desired printer from the list. If only one printer is available, that printer is displayed in the box 310. Note that the available printer is a printer which is compatible to the print application of this embodiment, and its printer driver is installed in the information processing apparatus. Upon launching this application, a printer which was selected upon previously quitting the application is selected.

A cartridge is selected using a box 311 in step S102, and a paper sheet is selected using a box 312 in step S103. In this embodiment, the paper size is fixed to A4, but other desired paper sizes may be selected.

It is checked in step S104 if a tab (one of 301b to 301d) used to display another window is selected. If NO in step S104, the flow returns to step S101. On the other hand, if YES in step S104, the flow advances to step S105 to settle contents set in the boxes 310 to 312 at that time as setup contents. Note that the setup contents can be changed later on the paper select window displayed by selecting the tab 301a from another window.

Figure 4:
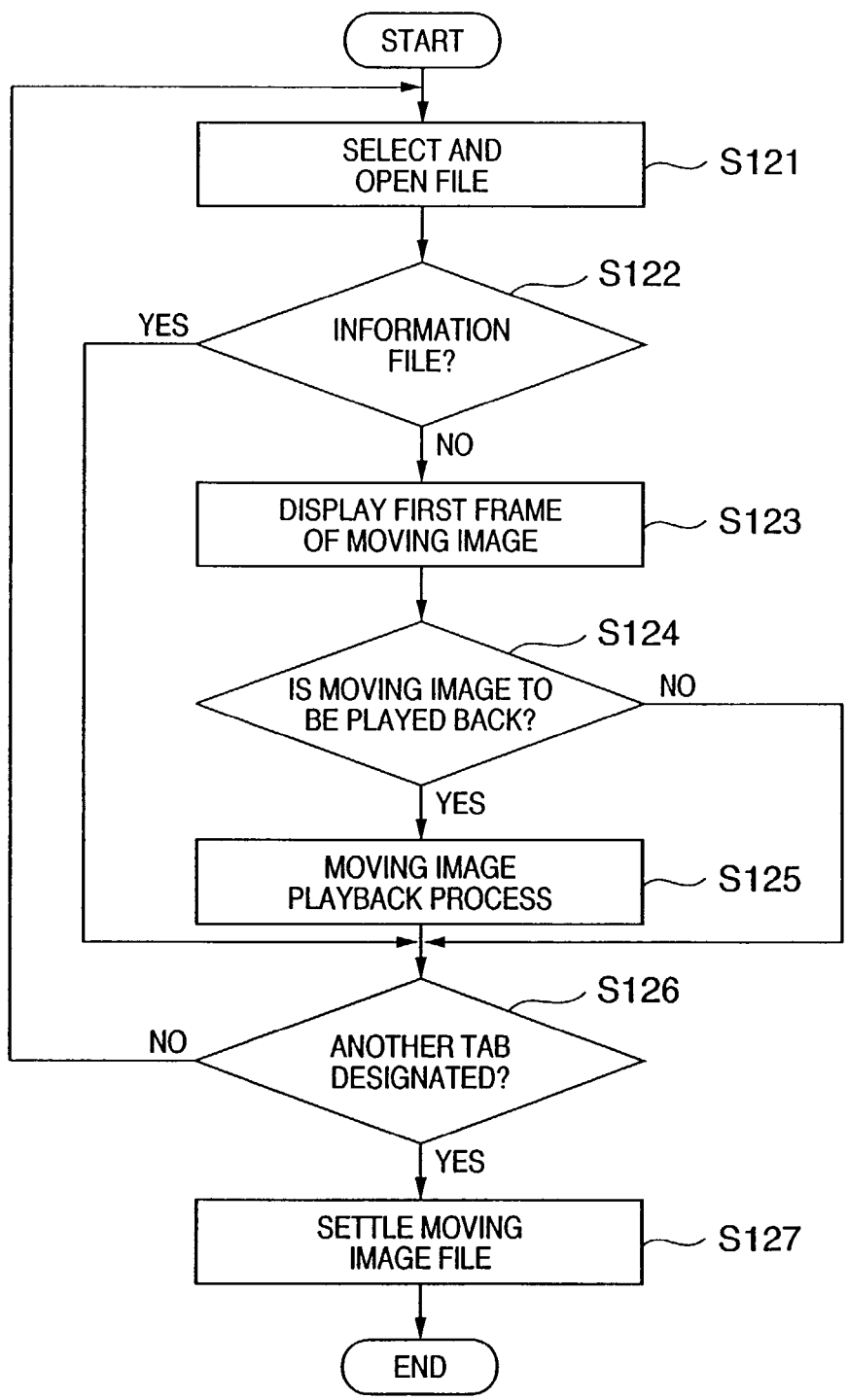
FIG. 4 is a flow chart for explaining the process executed when a moving image select window is selected.
Figure 8:
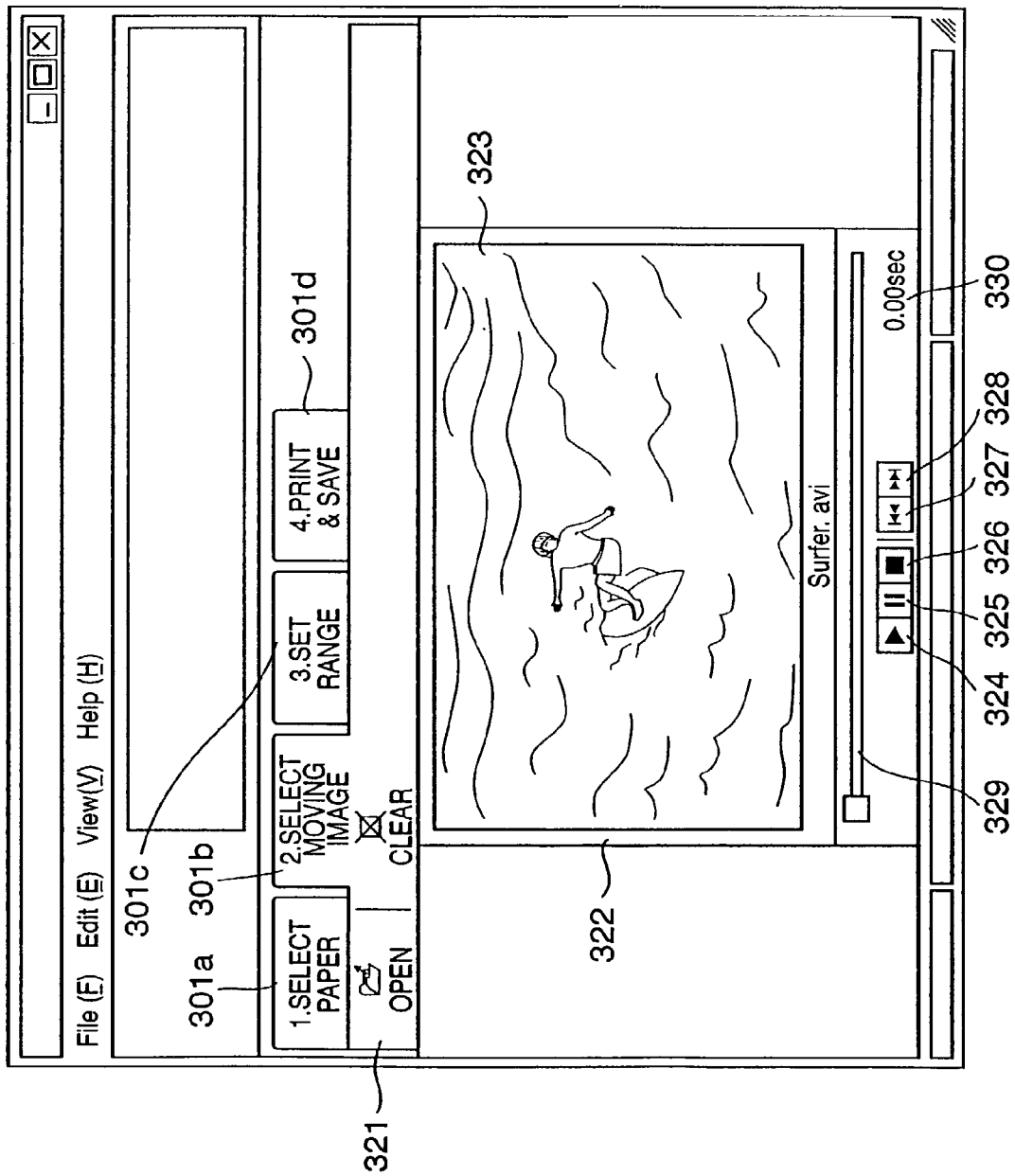
FIG. 8 shows a display example of the moving image select window.

A moving image select process executed when the moving image select window is displayed upon selecting the tab 301b will be explained below with reference to FIGS. 4 and 8. FIG. 4 is a flow chart for explaining the process executed when the moving image select window shown in FIG. 8 is selected.

In step S121, a file selected by user's file open operation is opened. In this case, a file select popup window (not shown) is displayed upon clicking an "open" button 321, and the user selects a desired moving image file using this window.

It is checked in step S122 if the file designated in step S121 was created and saved by the print process application. With this application, information for printing sequential still images can be saved in step S169 in a "print & save" process which will be described later with reference to FIG. 6. If it is determined in step S122 that such information file is selected, the flow jumps to step S126 without executing a moving image playback process to be described below. Note that the checking process in step S122 can be implemented with reference to, e.g., a file extension.

As will be described later, the information file saves the image file name, still image extraction range, and the like. Hence, in this embodiment, when the information file is opened, the print/save window is automatically displayed so as to immediately execute a print process. That is, when the information file is opened on the moving image select window, the step of playing back a moving image is skipped, and the control jumps to the print/save window (this jump process is not shown on the flow chart). In place of such process, even when the information file is selected, a moving image may be played back as in a case wherein a normal moving image file is selected. In such case, a moving image file corresponding to the image file name held in the information file is selected.

If the file selected in step S121 is a moving image file that this print application can process, the flow advances to step S123, and an image of the first frame of that moving image file is displayed on a moving image playback field 323 in a moving image playback window 322.

The moving image playback window 322 has a user interface including a play button 324 used to instruct to start the playback process of the selected moving image file, a pause button 325 used to instruct to pause the playback process and to cancel the paused state, a stop button 326 used to stop the playback process, a locate button 327 to locate the first frame of the moving image file, a locate button 328 to locate the last frame of the moving file, and a seek bar 329. By dragging the seek bar 329, a display position can be located at an arbitrary position in the moving image file. During playback of a moving image, the seek bar moves in corresponding to the playback position. A time indicator 330 indicates the current playback position by a time from the beginning of playback.

If playback of a moving is designated upon pressing the play button 324, the flow advances from step S124 to step S125, and the moving image file selected in step S121 is played back. Note that processes executed upon operation of other control buttons are not shown in the flow chart and a detailed description thereof will be omitted, but their contents are known to those who are skilled in the art.

If one of the tabs 301a, 301c, and 301d used to display another window is selected while the moving image file is selected, that moving image file or a moving image file designated by the information file is settled as a selected moving image file, this process ends, and the designated window is displayed (steps S126 and S127). If none of these tabs are selected, steps S121 to S125 are repeated. Note that the settled contents can be changed later on the moving image select window in FIG. 8 displayed by selecting the tab 301b from another window.

Figure 5:
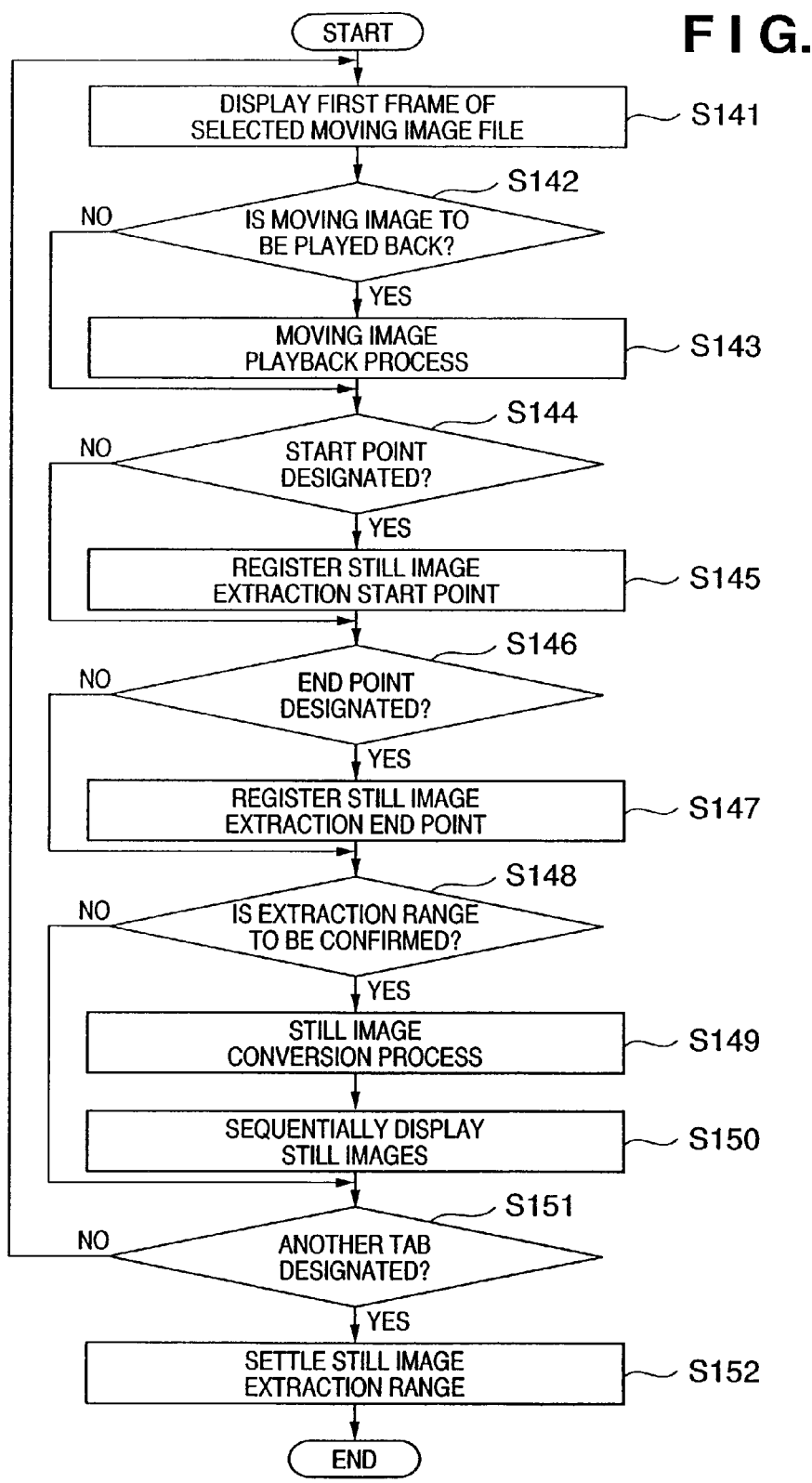
FIG. 5 is a flow chart for explaining the process executed when a range setup window is selected.
Figure 9A:
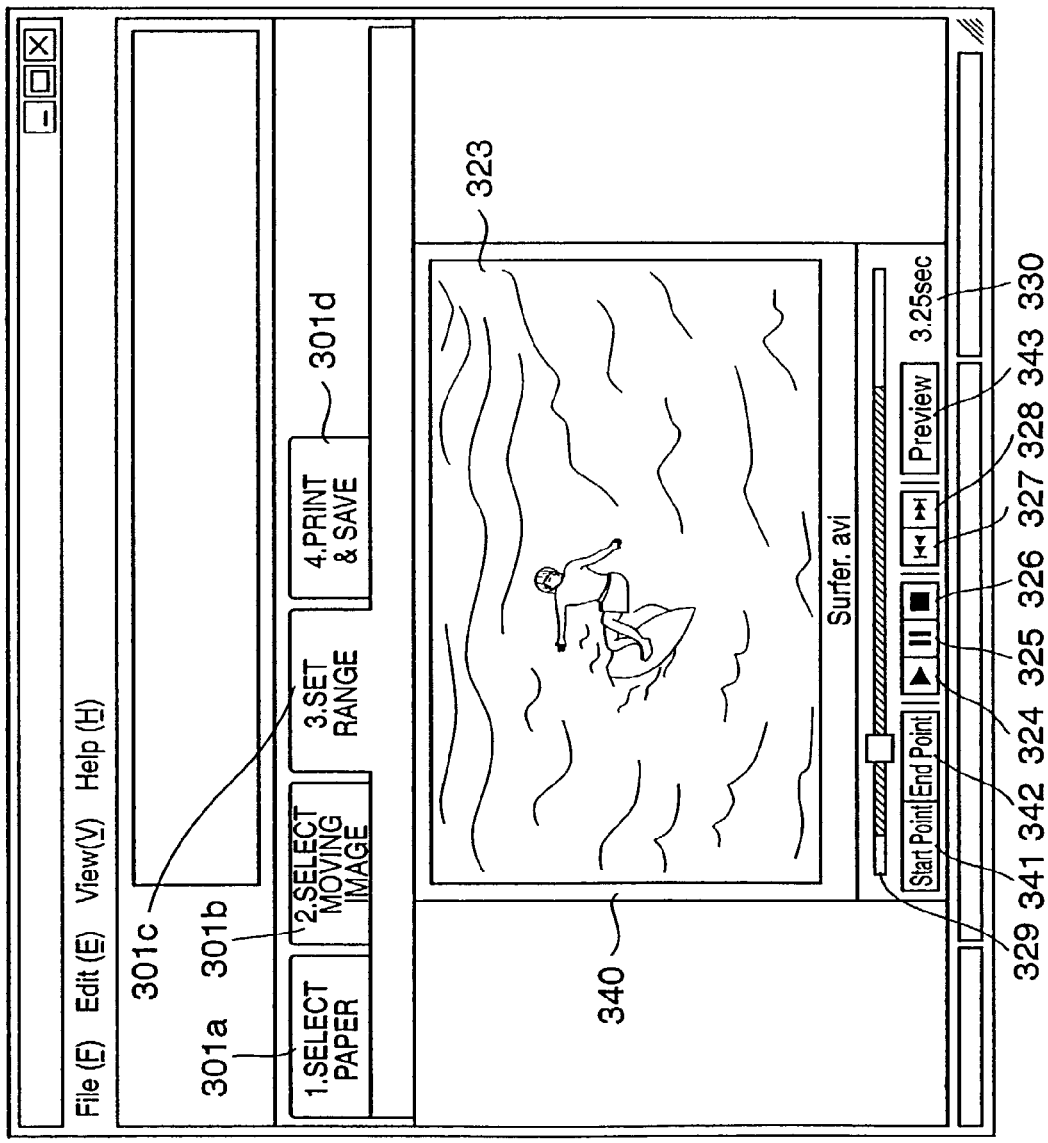
FIG. 9A shows a display example of the range setup window.

A range setup process executed when the range setup window is displayed upon selecting the tab 301c will be explained below with reference to FIGS. 5 and 9A. FIG. 5 is a flow chart for explaining the process executed when the range setup window shown in FIG. 9A is selected. On the range setup window, a desired range from which sequential still images are to be extracted (to be referred to as a still image extraction range hereinafter) is set from the moving image file.

As shown in FIG. 9A, a moving image playback window 340 which includes a moving image playback field 323 for playing back the selected moving image file, various control buttons 324 to 328, and a seek bar 329 is also displayed on the range setup window. Note that the moving image playback window 340 on the range setup window includes start and end point buttons 341 and 342 used to set a desired still image extraction range from the moving image, and a preview button 343 used to preview sequential still images obtained from the set still image extraction range as a flip moving image.

A moving image playback process in steps S141 to S143 is the same as that in steps S123 to S125 described above. That is, an image of the first frame of the moving image file, which has been selected on the moving image select window and settled as a selected file, is displayed on the moving image playback field 323 (step S141), and the user clicks the play button 324 (step S142) to start playback of that moving image file (step S143).

If the user clicks the start point button 341 during playback of this moving image file, a playback time at that timing is registered as the start point of the still image extraction range (steps S144 and S145). On the other hand, if the user clicks the end point button 342, a playback time at that timing is registered as the end point of the still image extraction range (steps S146 and S147). After the start and end points are registered, the selected range is identifiably displayed by, e.g., changing the display color of a portion of the seek bar 329 corresponding to the selected range, as shown in FIG. 9A, so as to indicate the selected still image extraction range.

In the above description, the start and end points are designated at desired timing during playback of the moving image file, thereby determining the desired range in the moving image. However, the present invention is not limited to this. For example, the start point of the still image extraction range may be designated by clicking the start point button 341 after the seek bar 329 is moved to a desired playback position, and the end point of the still image extraction range may be designated by similarly clicking the end point button 342. In such case, the moving image file need not be played back by the play button 324, and an image corresponding to a position designated by the seek bar 329 is displayed on the moving image playback field 323.

Also, the method of designating the still image extraction range while playing back the moving image, and the method of designating the still image extraction range using the seek bar may be combined. For example, the user locates a desired position in the moving image data by operating the seek bar 329, and clicks the start point button 341 to designate the start point of the still image extraction range. After that, the user clicks the play button 324 to play back the moving image from that position, and then clicks the end point button 342 at a desired position, thus setting the extraction range.

In this embodiment, the start and end points of the still image extraction range are registered using their playback times. However, the present invention is not limited to this, and frame numbers or the like may be used.

The print process application of this embodiment extracts a predetermined number of sequential still images (45 images in this embodiment) from the still image extraction range set in this way at equal intervals, and prints them out. The printout of the sequential still images obtained in this manner is used for the purpose of observing the sequential still images as a flip moving image by tearing the printout into strip sheets and sequentially flipping these strip sheets. For this purpose, it is preferable to preview the sequential still image so as to allow the user to virtually observe a flip moving image. In the subsequent steps S148 to S150, such preview function is provided.

If the user clicks the preview button 343 after he or she sets the still image extraction range by designating the start and end points, the flow advances from step S148 to step S149 (note that the flow cannot advance to step S149 unless the still image extraction range is set). In step S149, a predetermined number of sequential still images are generated and acquired from the set still image extraction range. At this time, the sequential still images are generated so that neighboring images have equal intervals (the same number of frames) on the time axis. That is, frames are extracted from the set still image extraction range at equal intervals, and sequential still images are generated from the extracted frames.

Note that frame extraction in step S149 can be implemented at nearly equal intervals using:

$$m=1+INT((n-1) \times (M-1)/(N-1)+0.5)$$

where INT(x) is a function of obtaining a value by rounding x after the decimal part;
M: the number of frames in the selected range;
N: the number of frames to be extracted (N>1, N=45 in this embodiment);
n: frame order number (1 to N); and
m: extracted frame number (1 to M).
(M, N, n, and m are all integers)

In the above equation, if $M=(N-1) \times y+1$ (y is an integer equal to or larger than 1), all the intervals of frames become equal to each other.

In step S150, the sequential still images generated in step S149 are sequentially displayed on the order they are captured so that the image display ends in, e.g., 2 sec. At this time, the switching interval from a given still image to the next still image is set to be constant (2/45 sec if 45 sequential still images are to be displayed in 2 sec).

When the user clicks the preview button 343 without changing the selected range in the moving image, the process in step S149 is skipped since the sequential still images have already been generated.

If the user clicks one of the tabs 301a, 301b, and 301d corresponding to other control windows in this state, the flow advances from step S151 to step S152 to settle the still image extraction range set in the above steps. Note that the settled contents can be changed later on the range setup window displayed by selecting the tab 301c from another window. On the other hand, if none of the tabs corresponding to other control windows are clicked, the flow returns to step S141 to repeat the aforementioned process. Therefore, according to this embodiment, since preview display and range setup operations can be made on a single window (range setup window), the user can re-designate the range immediately after he or she confirms a flip moving image by the preview function, resulting in good operability.

Note that a preview setup panel 344 shown in FIG. 9B may be displayed in preview display of sequential still image in step S150, so as to allow the user to arbitrarily set a time required to display. For example, the total display time may be arbitrarily set, as indicated by a field 345 in FIG. 9B. If it is set to display still images in 1 sec, sequential still images are displayed while being switched at $1/45$-sec intervals. Also, the switching interval of sequential still images may be designated (e.g., 0.04 sec), as indicated by a field 346 in FIG. 9B.

Furthermore, a manual operation may be allowed, as indicated by a field 347 in FIG. 9B. In this example, when the user slides a knob 349 of a displayed slide bar 348, sequential still images are displayed while being switched to follow the slide operation. In this manner, the switching interval which is set using the field 345 or 346 and is constant and fixed during sequential display can be varied, and preview images that can accurately correspond to user's flip operation can be displayed.

Figure 6:
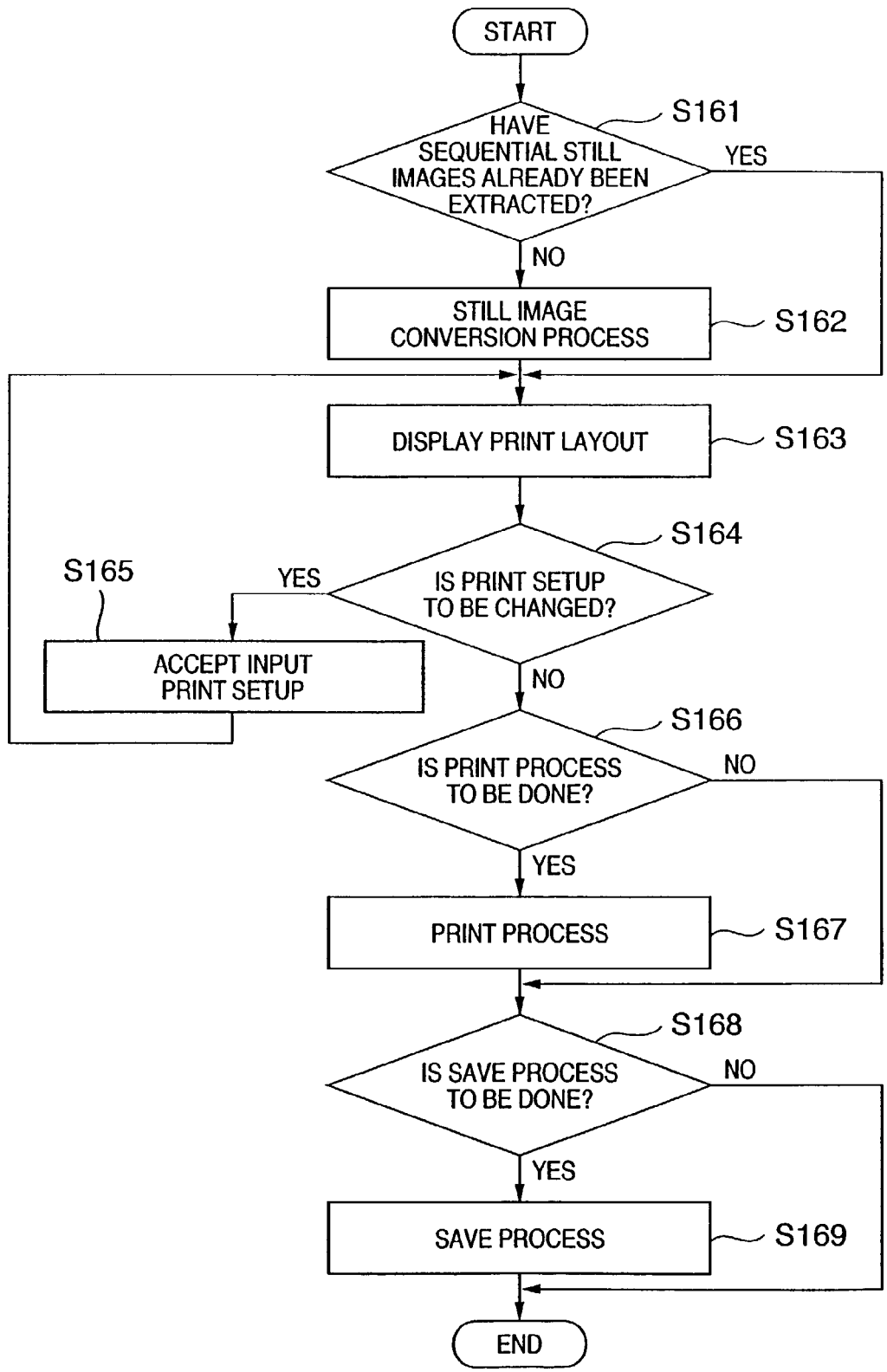
FIG. 6 is a flow chart for explaining the process executed when a print/save window is selected.
Figure 10A:
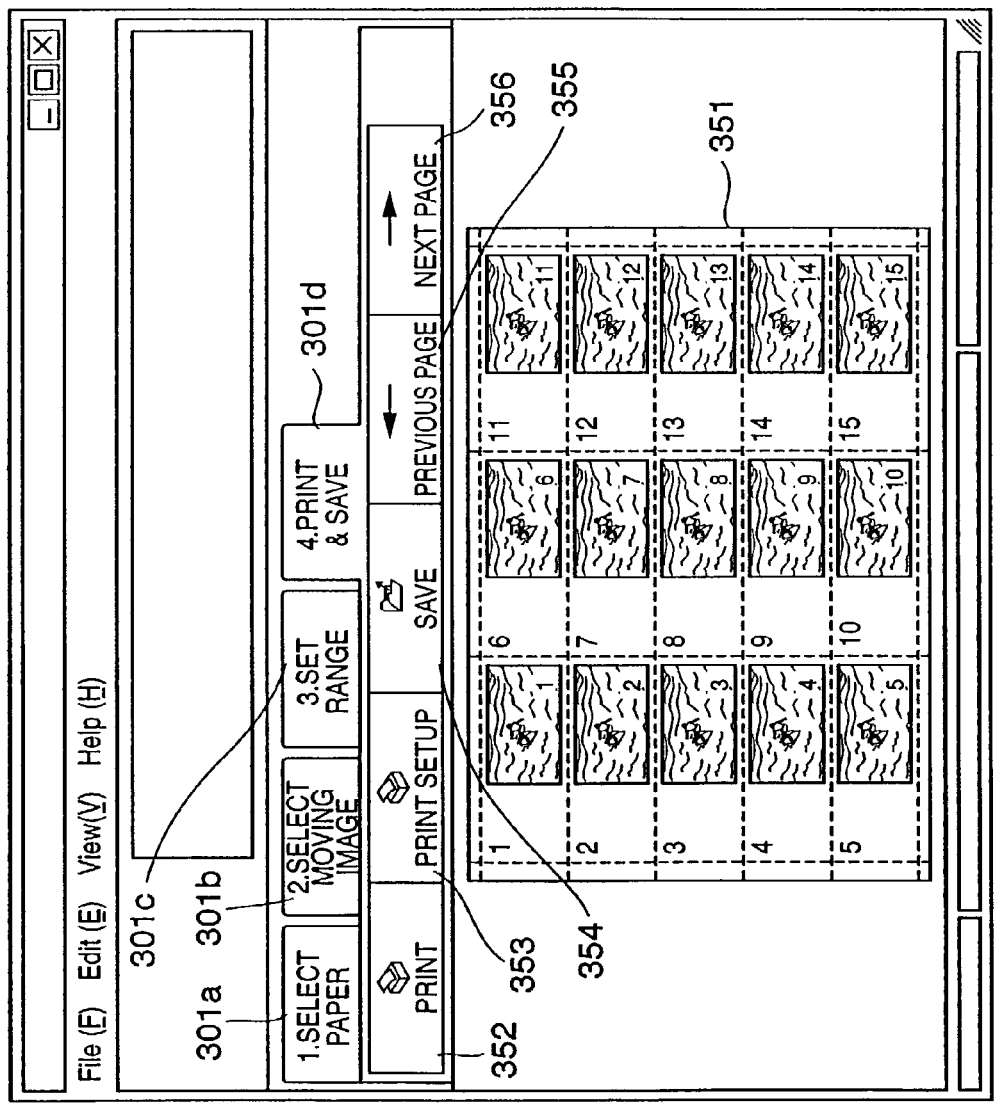
FIG. 10A shows a display example of the print/save window.

A process executed when the print/save window is displayed upon selection of the tab 301*d* will be explained below. FIG. 6 is a flow chart showing the process executed when the print/save window shown in FIG. 10A is selected. On this print/save window, sequential still images obtained from the still image extraction range set on the range setup window can be printed, and an information file that contains the moving image file name and extraction information can be saved.

It is checked in step S161 if the currently set extraction range has already undergone the still image conversion process in step S149. If the process in step S149 is complete, since sequential still images of that still image extraction range have been obtained, step S162 is skipped. If sequential still images have not been acquired yet from the set extraction range, the flow advances to step S162 to extract a predetermined number of sequential still images from the still image extraction range set on the previous range setup window. This process is the same as step S149 in FIG. 5.

In step S163, a print layout using the generated sequential still images is displayed. In this embodiment, since 15 sequential still images are printed on each A4-size paper sheet, a total of three pages are to be printed. Hence, by operating a next or previous page button 356 or 355, the user can confirm the print layouts of all pages. In FIG. 10A, numerical values are appended to sequential still images for the purpose of convenience to indicate that they are sequential images (not a series of identical images). Also, a numerical value recorded on the corner of a blank space of each strip indicates a page number, i.e., the order in the moving image.

If the user clicks a print setup button 353, it is determined that print setups are to be changed, and the flow advances to step S165. In step S165, a print setup input window (not shown) is displayed and, for example, the following print setup items are set.

[Layout]

Right-binding: Images are printed in a layout for a left-handed user.

Left-binding: Images are printed in a layout for a right-handed user.

[Background]

None: No background image is printed around each sequential still image.

Black gradation: A black gradation pattern, which changes from each sequential still image toward a blank space, is printed around each sequential still image.

Gradation of designated color: A gradation pattern of a designated color, which changes from each sequential still image toward a blank space, is printed around each sequential still image.

(Default is "Black Gradation")

[Title]

None: No title name is printed.

Print title: An input character string is printed as a title (whether the title is printed only on the first page or on all pages is selectable)

(Default is "none")

[Image Capture Date]

None: No image capture date is printed.

Print date: An image capture date is printed ((whether the title is printed only on the first page or on all pages is selectable).

(Default is "None")

After the print setups, the flow returns to step S163 to display the print layout based on the updated print setups. In this manner, changes in print setup can be immediately reflected in the displayed print layout.

Figure 10B:
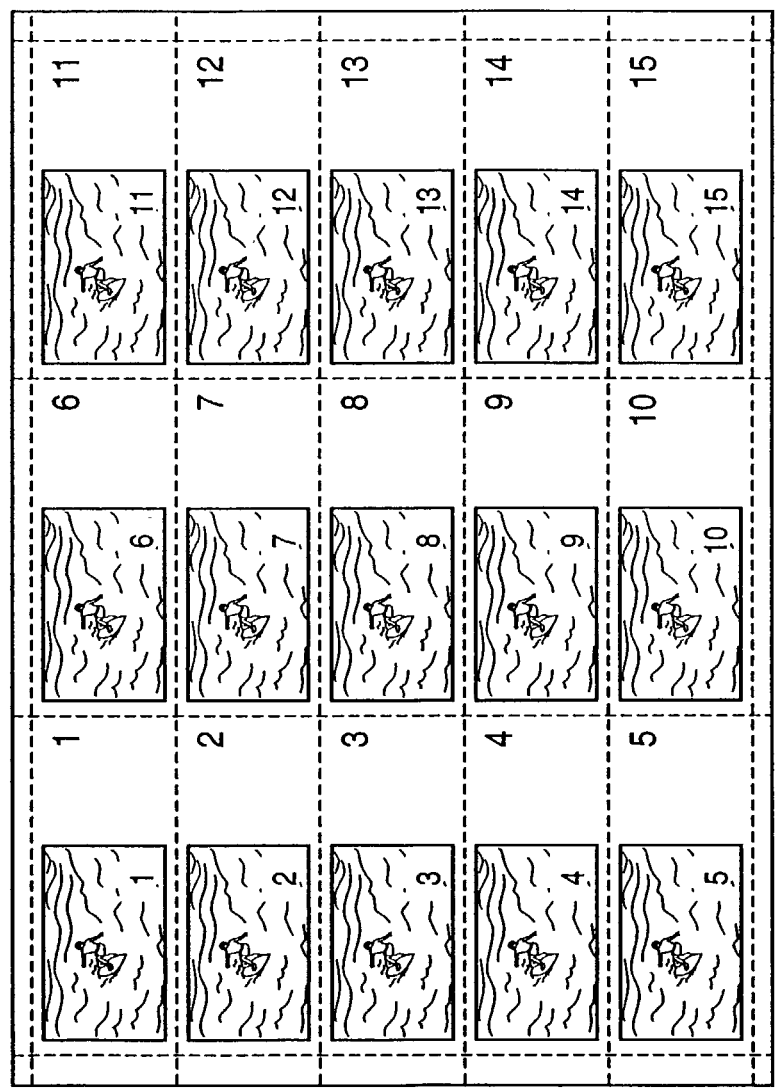
FIG. 10B shows an example of a printout.

If the user clicks a print button 352, the flow advances from step S166 to step S167 to print sequential still images by the designated printer, as shown in FIG. 10B. At this time, each sequential still image is printed in a size reduced to fall within a 42 mm×34 mm region while fixing the aspect ratio of the sequential still image extracted from the moving image. Also, the print quality at that time is default quality of designated media. If a given background pattern is designated, the designated background pattern is printed; if an image capture date and title are designated, they are printed according to their designations. Furthermore, a number is printed on a blank space (an upper right corner position in case of right-binding or an upper left corner position in case of left binding in this embodiment) aside each sequential still image (FIG. 10 shows an example of right-binding, and page numbers are assigned at upper right corner positions).

If the user clicks a save button 354, the flow advances from step S168 to step S169. In step S169, respective items set on the paper select window, moving image select window, range setup window, and print/save window (print setup) are saved as a single file. For example, items to be saved include the printer to be used, cartridge information, paper sheet, moving file name, still image extraction start and end positions, print setup contents (layout, background, and the like). However, extracted sequential still image data are not saved.

Since 45 sequential still images obtained in this way are printed on a perforated paper sheet shown in FIG. 23, as shown in FIG. 10B, if these images are torn along perforations into strip sheets, these sheets can be bundled, as shown in FIG. 18. The user can observe a flip moving image by sequentially flipping these sheets, as shown in FIG. 19.

As described above, according to the print process application of this embodiment, sequential still images that can be observed as a flip moving image can be printed out in correspondence with the desired range of moving image data. Also, a flip moving image that the user wants can be easily provided.

Especially, since the preview function, which is launched by the preview button 343 on the range setup window (FIG. 9A) that has been explained using FIGS. 9A and 9B, sequentially displays sequential still images extracted from the designated range while switching them, a state wherein the user observes a flip moving image by bundling the sequential still images and sequentially flipping them, as shown in FIGS. 18 and 19, can be confirmed, resulting in convenience. If the user is dissatisfied with the previewed image, he or she can immediately re-designate the still image extraction range without switching windows, thus improving operability.

If the switching interval of still images can be set in the preview function, the user can preview images at a desired flip speed. Furthermore, if a mechanism for controlling switching of sequential still images in synchronism with the slide motion of the knob 348 of the scroll bar 348 is provided in the preview function, the display switching interval can be switched during sequential display. For this reason, a preview process corresponding to the user's habit upon observing a flip image (e.g., the speed at the beginning and end of flipping is lower than other portions) can be implemented, and the user can preview a flip moving image more accurately.

[Sequential Still Image Complement Process when the Number of Frames is Deficient]

As described above, in this embodiment, a desired range in a moving image can be designated by designating the moving image extraction start and end points on the range setup window. Hence, an extraction range of less than 45 frames may be designated depending on the designated range. In such case, 45 sequential still images cannot be generated in step S149 or S162. The print process application of this embodiment can appropriately obtain 45 sequential still images even in such case.

Figure 11:
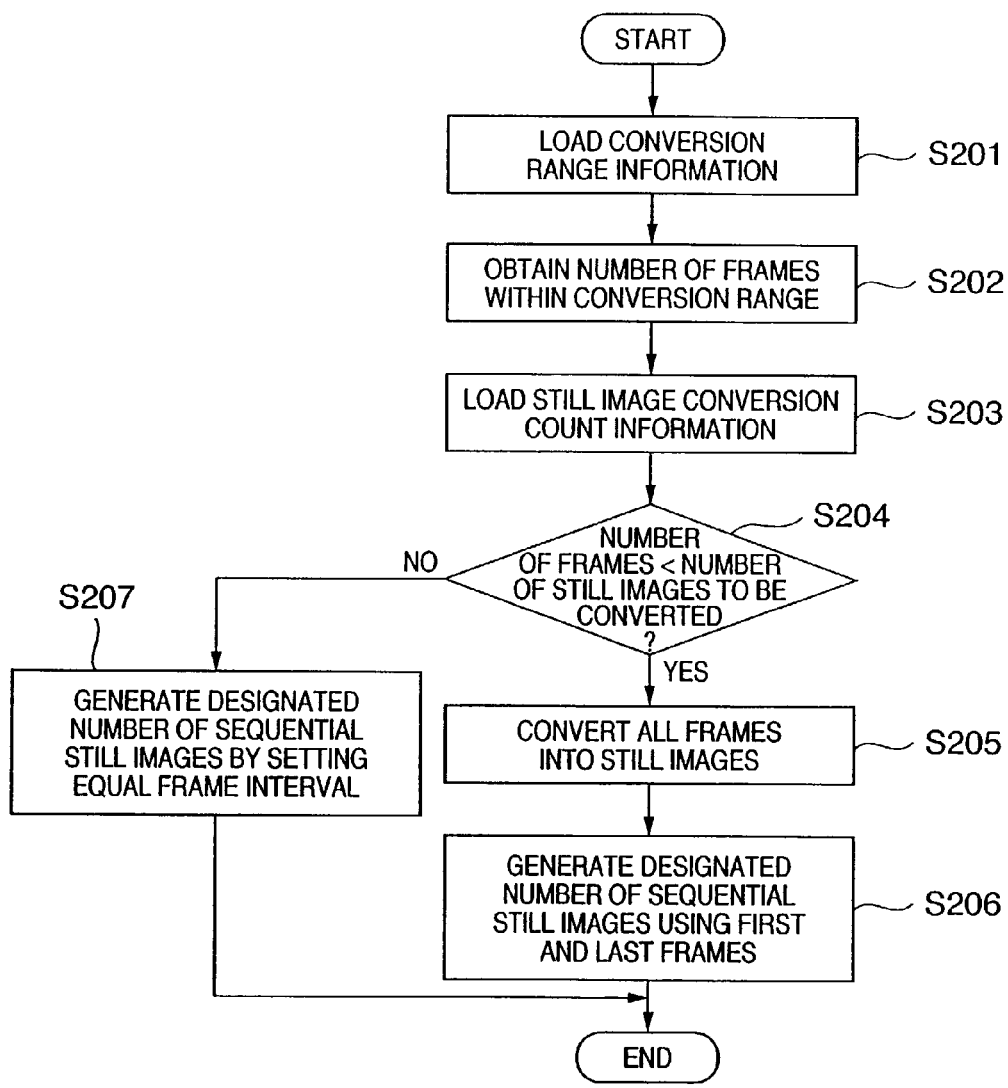
FIG. 11 is a flow chart for explaining the still image conversion process in step S149 or S162 in more detail.

FIG. 11 is a flow chart for explaining the still image conversion process in step S149 or S162 in more detail.

In step S201, the still image extraction range (start and end points) set in steps S144 to S147 above is loaded as conversion range information. In step S202, the number of frames included in the still image extraction range is obtained. In step S203, the number of still images to be converted is loaded. As described above, since the number of images is fixed at 45 in this embodiment, the number of still images to be converted is 45.

In step S204, the number of frames included in the still image extraction range obtained in step S202 is compared with the number of still images to be converted (45) loaded in step S203. If the number of frames of the extraction range is equal to or larger than the number of still images to be converted, since 45 sequential still images can be extracted, the flow advances to step S207 to extract a predetermined number of frames at equal intervals by the same method as in step S149 above, and to convert them into still images.

On the other hand, if the number of frames of the extraction range is smaller than the number of still images to be converted, 45 sequential still images must be generated by complementing deficient images. Hence, the flow advances from step S204 to step S205. In step S205, all frames included in the designated still image extraction range are converted into still images. In step S206, deficient images are complemented by repetitively using a given frame within the still image extraction range. In this embodiment, by repetitively using a frame located at the start or end of a time series (i.e., by repetitively using a sequential still image corresponding to a frame located at the start or end of a time series), a designated number of sequential still images are generated. Upon observing a flip moving image, if an identical image is repeated in the middle of flipping, the user may be disrupted. However, even when an identical sequential still image is repeated several times at the start or end of flipping, the user is not so disrupted.

The way sequential still images are complemented may be changed in accordance with the number of images to be repeated (the number of deficient images). That is, a frame position used to repeat an image may be changed in accordance with the number of deficient images. For example, when the number of deficient images is equal to or smaller than a predetermined threshold value, a sequential still image of the first and/or last frame is repetitively used; if the number of deficient images is larger than the predetermined threshold value, sequential still images to be repetitively used are distributed among all the frames.

For example, if the ratio of the number of deficient images to the predetermined number of images is:

lower than 10% (less than 5 images if the predetermined number of images is 45), the last frame is repetitively used;

falls within the range from 10% to 20% (6 to 9 images), first 10% (5) images are completed by repeating the last frame, and remaining deficient images are completed by repeating the first frame; and exceeds 20% (10 images or more), frames to be repeated are distributed to all the frames. Or when the number of deficient images exceeds 20% of the predetermined number of images, a range designation error may be generated.

Alternatively, the user may designate a frame (or its position) to be repeated. For example, the user may select a frame to be repeated from "last frame" and "first frame".

In the aforementioned method, the reason why the last frame is preferably used as a frame to be repeated is that it becomes difficult to flip frames near the end of a flip moving image one by one, and some sheets may be flipped at the same time upon observing the flip moving image. Therefore, the process for complementing sequential still images by repeating the last frame is very effective means since the influence of repeated images can be suppressed on the printout used to observe a flip moving image, and the process itself can be simplified.

Upon repeating a sequential still image of an identical frame, an image may undergo a given process. For example, when some images are repeated near the end of a flip moving image, the luminance values of these images may be gradually lowered to provide a fade-out effect upon generating sequential still images to be complemented. Likewise, when some images are repeated at the beginning of a flip moving image, the luminance values of print data may be adjusted to provide a fade-in effect upon generating sequential still images to be complemented.

[Details of Print Process]

Sequential still images of this embodiment are printed on a paper sheet formed with perforations, along which the paper sheet is torn into strip sheets. The strip sheets are bundled using blank spaces formed aside still images as binding margins, thus allowing the user to observe a flip moving image. Hence, the entire image moves unnaturally upon observing a flip moving image unless still images are printed at predetermined positions in strips formed by perforations with high reproducibility. In general, the print positions can be maintained with relatively high precision on a single sheet. However, when sequential still images are printed on a plurality of paper sheets as in this embodiment, a deviation between the overall print positions on different paper sheets poses a problem.

Figure 12:
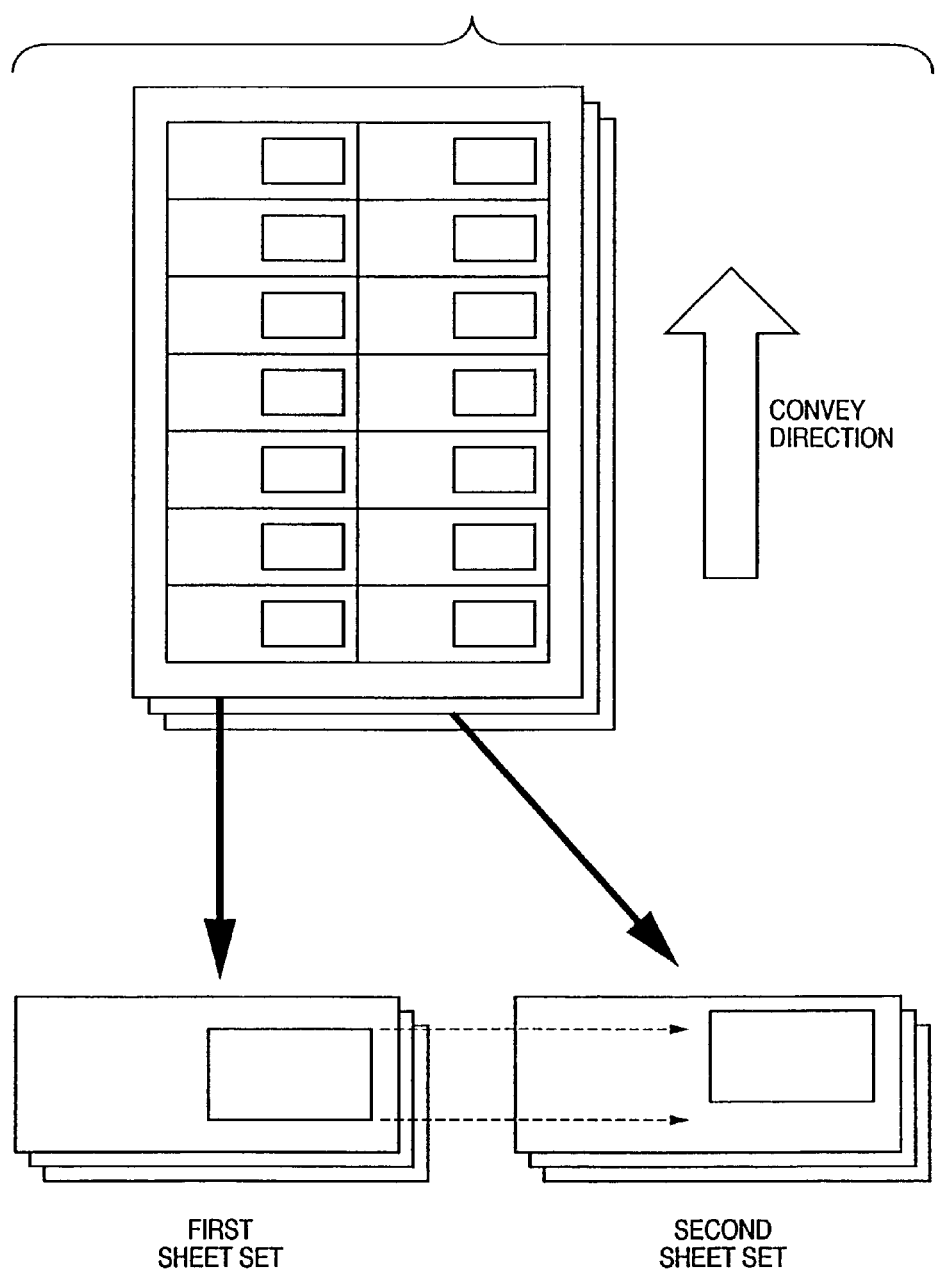
FIG. 12 is a view for explaining the influence of a paper convey error on printed sequential still images.

In general, print positions in the convey direction have low precision due to the influence of convey errors in the convey direction of paper sheets. By contrast, print positions in a direction perpendicular to the convey direction can have relatively high precision due to the presence of paper guides and the like. Therefore, when sequential still images are printed in a layout in which arrays of sequential still images and blank spaces extend in a direction perpendicular to the convey direction, as shown in FIG. 12, the print positions of sequential still images on strip sheets obtained from a given paper sheet readily deviate in the up-and-down direction rather than the right-and-left direction from those obtained from the next paper sheet. For this reason, in a flip moving image of this embodiment that obtains 15 strip sheets per paper sheet, sequential still images move in the up-and-down direction between the 15th and 16th strip sheets and between the 30th and 31st strip sheets.

According to the experiments of the present inventors, upon observing a flip moving image, the user feels more disrupted when sequential still images deviate in the up-and-down direction than in the right-and-left direction. Hence, in this embodiment, still images are laid out and printed out to minimize the deviations in the up-and-down direction in the print process in step S167. This process will be explained below.

Figure 13:
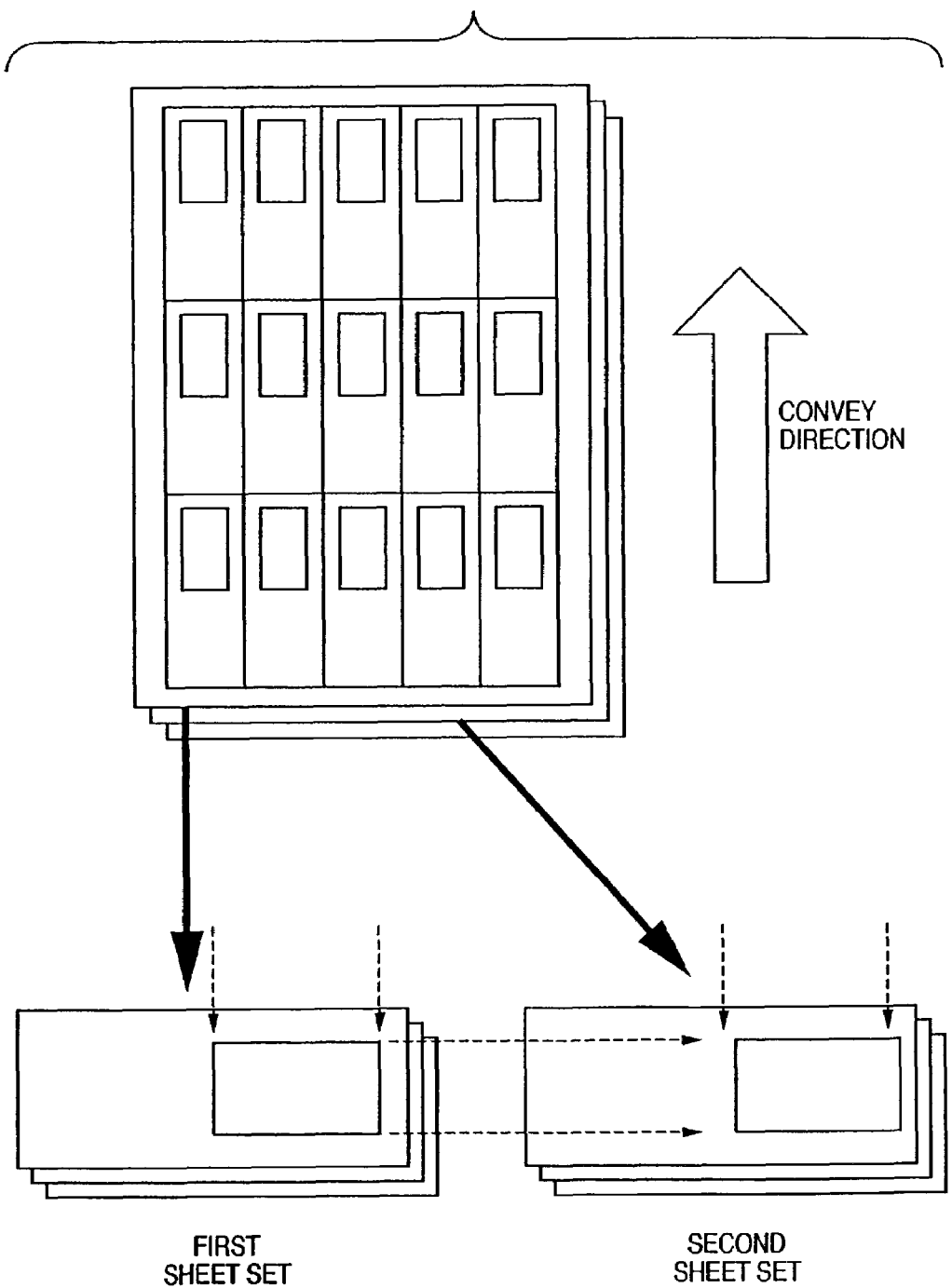
FIG. 13 is a view for explaining the influence of a paper convey error on printed sequential still images.

FIG. 13 is a view for explaining a layout upon printing out sequential still images in this embodiment. As shown in FIG. 13, sequential still images and blank spaces that can be used as binding margins are formed on respective strips on a printout of this embodiment, so that arrays of sequential still images and blank spaces always agree with the convey direction. As described above, upon printing images on a plurality of paper sheets, the print position precision in a direction perpendicular to the convey direction is higher than that in the convey direction. Therefore, when a flip moving image is observed while bundling strip sheets obtained by tearing printouts with the layout shown in FIG. 13 along perforations, still images may move slightly larger in the right-and-left direction, but the positions of still images in the up-and-down direction match with relatively high precision. As described above, upon observing a flip moving image by sequentially flipping still images, the user feels more disrupted when still images move in the up-and-down direction than in the right-and-left direction. Hence, by minimizing movement in the up-and-down direction, strip sheets that allow the user to observe a high-quality flip moving image can be provided.

As can be easily understood for those who are skilled in the art, when a paper sheet is conveyed at a landscape position, the layout shown in FIG. 12 is used. Therefore, when the user can designate the convey direction of paper sheets, it is preferable to automatically select an appropriate print layout in correspondence with the designated convey direction. That is, the designated convey direction and paper size are detected, and a print layout is determined to arrange sequential still images and blank spaces in the convey direction, thus executing a print process.

As described above, according to this embodiment, sequential still images can be laid out and printed, so that the print position precision in the up-and-down direction becomes higher than that in the right-and-left direction upon observing a flip moving image.

The printout of this embodiment is further designed to improve the print quality of sequential still images. When an image is printed by repeating a print scan in a direction perpendicular to the convey direction while conveying a paper sheet like in an ink-jet printer, convey errors readily occur especially at the trailing end of a paper sheet in the convey direction, and image quality deteriorates. This is because the distance between a print head and paper sheet changes due to conspicuous convey errors since the pressing force of the paper sheet becomes loose at the trailing end of the paper sheet and a paper sheet readily floats.

As described above, when a layout in which sequential still images and blank spaces are arranged along the convey direction of a paper sheet is adopted, either sequential still images or blank spaces are located at the trailing end of the paper sheet, FIG. 14 shows a layout for right-binding, and the convey direction in a print process. When the layout shown in FIG. 14 is adopted, since blank spaces are located on the trailing end side of a paper sheet with respect to the convey direction of the paper sheet, sequential still images do not suffer any adverse influences for the aforementioned reasons. However, when a layout for left-binding is designated, i.e., when sequential still images are laid out by moving their print positions so that blank spaces are located on the left side of the sequential still images, as shown in FIG. 15, the sequential still images are located on the trailing end side of a paper sheet. Therefore, the print quality of the 11th to 15th sequential still images may deteriorate.

To solve this problem, in this embodiment, blank spaces are laid out on the trailing end side of a paper sheet in both the layout for right-binding and that for left-binding. In this embodiment, the entire print layout for left-binding shown in FIG. 15 is further rotated through 180° to obtain a print layout shown in FIG. 16.

Figure 17:
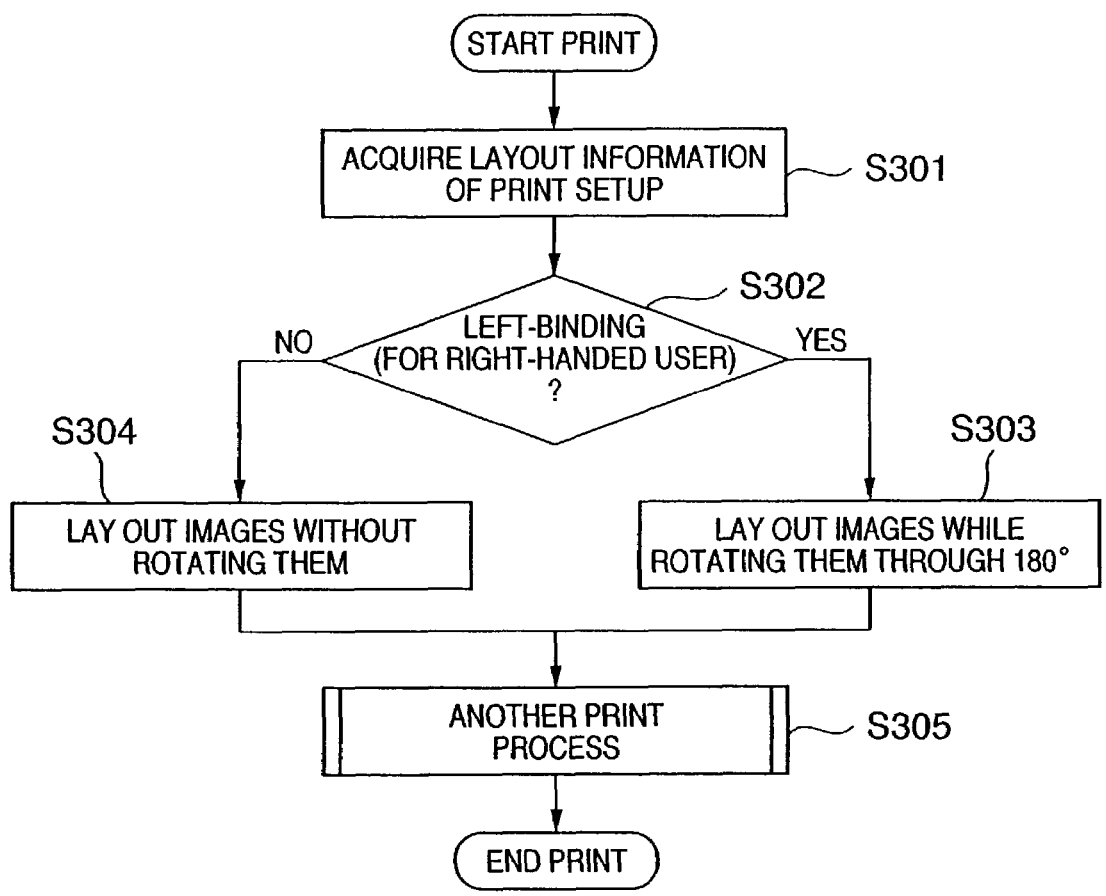
FIG. 17 is a flow chart for explaining the process of a print layout according to the embodiment of the present invention.

FIG. 17 is a flow chart for explaining this print process. When a print process in step S168 starts, this process is launched.

In step S301, layout information of the print setups, i.e., information indicating if the selected layout is one for left-binding or right-binding is acquired. If the acquired layout information indicates a layout for right-binding, the flow advances from step S302 to step S304, and sequential still images are laid out to obtain printouts shown in FIG. 14. The flow then advances to step S305 to execute a print process of sequential still images.

On the other hand, if the layout information acquired in step S301 indicates a layout for left-binding, the flow advances from step S302 to step S303. In step S303, the print positions of sequential still images are moved to the right side of respective strips to obtain a layout shown in FIG. 15, and this layout is rotated through 180° to obtain a print layout shown in FIG. 16. The flow then advances to step S305 to execute a print process of sequential still images. As a result, blank spaces are always located on the trailing end side of a paper sheet, as shown in FIGS. 14 and 16, thus preventing the image quality of sequential still images from deteriorating.

In this embodiment, a 180°-rotated layout is used in case of that for left-binding. However, the present invention is not limited to such specific process. That is, it is important for a print layout to arrange sequential still images and blank spaces along the convey direction, and to locate blank spaces on the trailing end side of a paper sheet in the convey direction.

Upon displaying a print layout in step S163, sequential still images are displayed at normal positions. Therefore, even when left-binding is set in this embodiment, a layout is displayed, so that sequential still images are displayed at normal positions, i.e., as shown in FIG. 10A.

As described above, according to this embodiment, since a print layout is designed in correspondence with the characteristics of a printer, i.e., since a print layout in which sequential still images and blank spaces are arranged along the convey direction, and blank spaces are located on the trailing end side of a paper sheet in the convey direction is adopted, a high-quality flip moving image can be provided.

The print application of this embodiment has been explained. In this embodiment, the print process application runs on the information processing apparatus such as a personal computer or the like. However, the present invention is not limited to this, and all or some of functions of the aforementioned application may be implemented by a printer driver, digital still camera, digital video camera, or printer.

In the above embodiment, an ink-jet printer is assumed as the printer, but an electrophotographic printer such as a laser printer or the like, or a thermal transfer printer may be used.

In the above embodiment, the number of sequential still images is fixed at 45, but may be arbitrarily set by the user. For example, when a layout changes depending on the direction of a paper sheet, and the number of strip sheets that can be acquired per paper sheet changes (when a paper sheet is conveyed at a landscape position and a layout shown in FIG. 12 is used, 14 strip sheets can only be obtained from one paper sheet), the total number of sequential still images to be acquired may be changed accordingly. For example, when a print layout shown in FIG. 12 is designated, 42 sheets (=14×3) may be set.

[Strip Case]

A case which houses a bundle of a plurality of strip sheets that include sequential still images printed out, as described above, and allows the user to observe a flip moving image will be explained below.

FIG. 18 shows a state wherein a bundle of strip sheets on which sequential still images are printed is housed in a case of this embodiment. As shown in FIG. 18, the case of this embodiment comprises a flexible U-shaped case member 400, a strip sheet group 410 to be housed in this case member, and a rubber band 420 used to bundle the case member 400 and strip sheet group 410 and to maintain that state. FIG. 19 shows an observation state of a flip moving image by sequentially flipping strips, which are housed, as shown in FIG. 18. FIG. 19 shows a left-binding state (for a right-handed user).

Figure 20A:
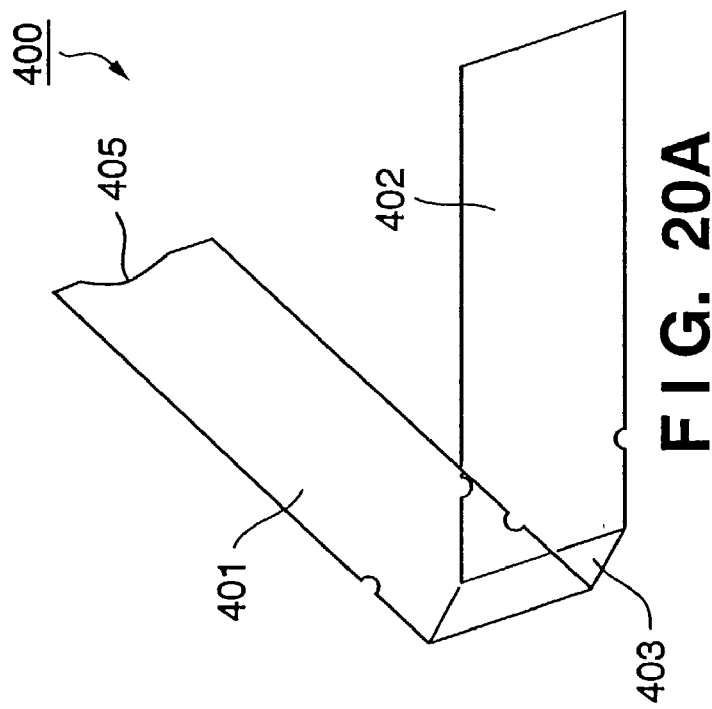
FIGS. 20A to 20D are views for explaining the build sequence of the case according to the embodiment of the present invention.

FIGS. 20A to 20D are views for explaining the build sequence of the case according to this embodiment. The case member 400 is formed of a flexible material, and is preferably transparent or translucent. The case member 400 includes a nearly rectangular first panel 401, a nearly rectangular second panel 402 which faces the first panel 401 when a U-shape is formed, and a third panel 403 that connects the first and second panels 401 and 402. As shown in FIG. 21, the first to third panels are formed of an integrated sheet, and are formed by fold lines 410. The sheet shown in FIG. 21 is foldable at the fold lines 410, as shown in FIG. 20A, thus forming a U-shaped case by the first to third panels 401 to 403.

Figure 20B:
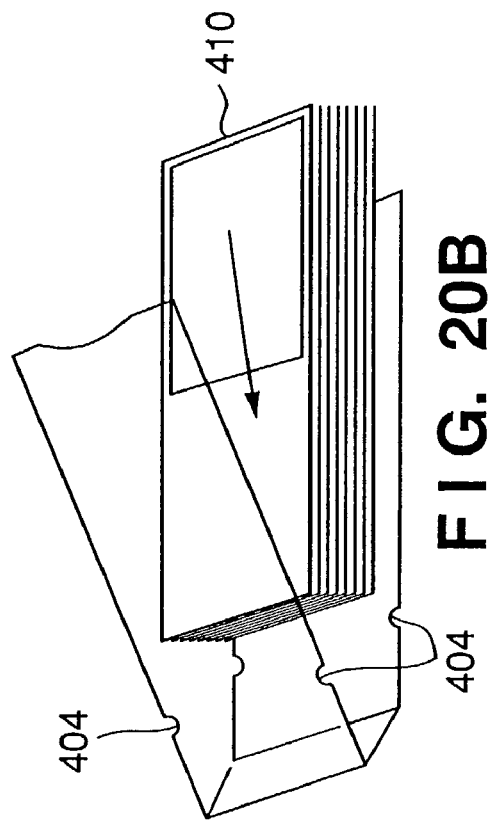
Figure 21:
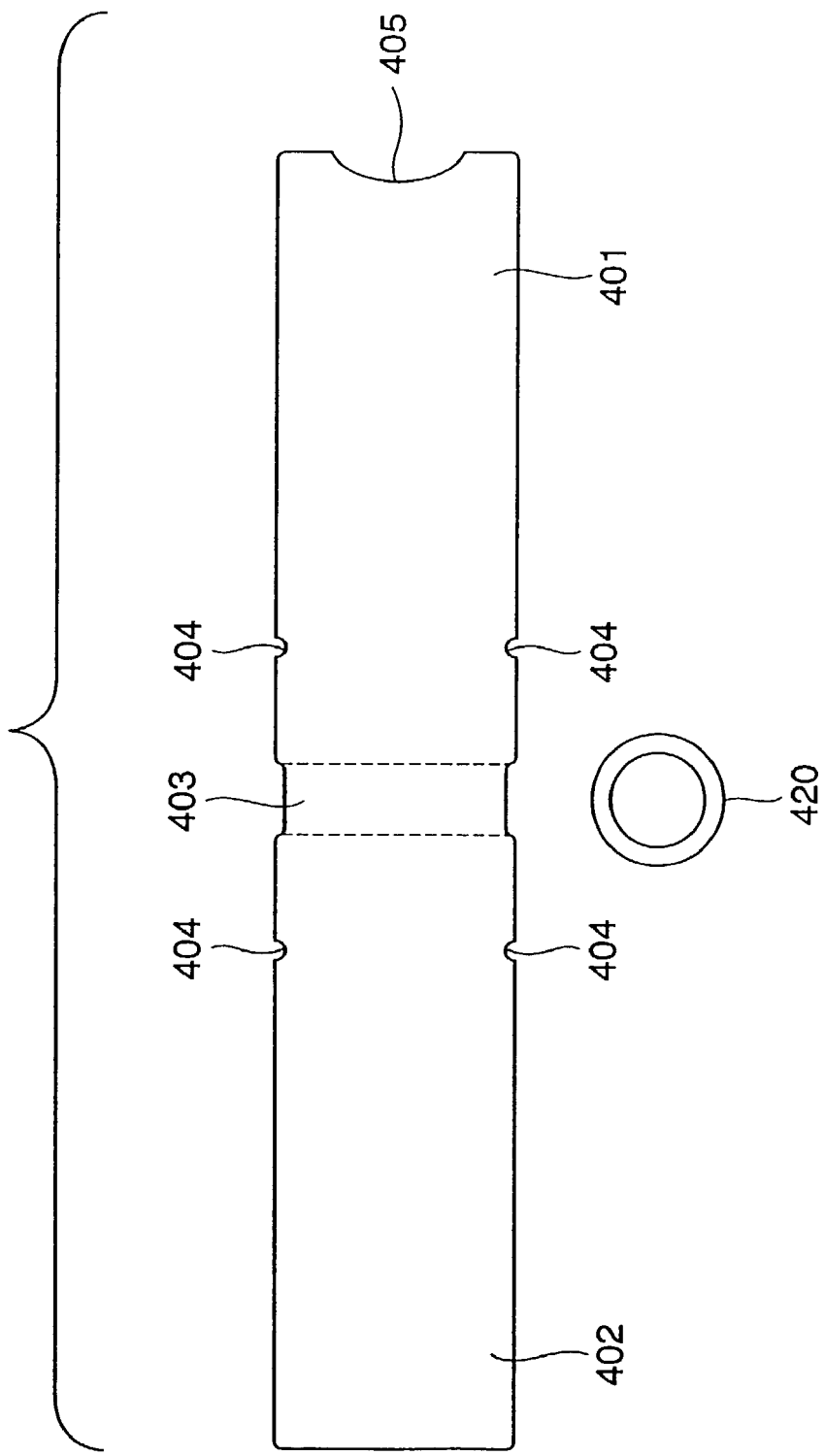
FIG. 21 shows members which form the case according to the embodiment of the present invention.

As shown in FIG. 20B, the stacked stripe sheet group 410 (45 strip sheets in this example) is inserted between the first and second panels 401 and 402. Therefore, the length of the third panel (a height upon forming a U-shaped case) is equivalent to the thickness of a stack of 45 strip sheets.

Figure 20C:
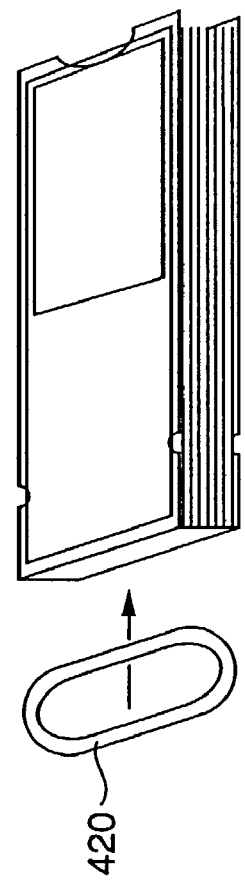
Figure 20D:
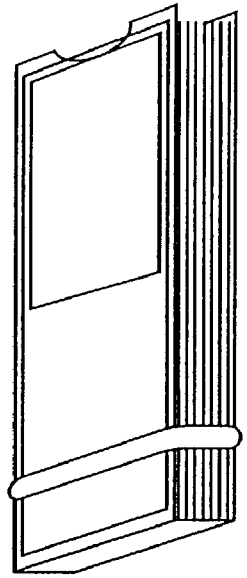

Notches 404 are formed on the long sides of the first and second panels 401 and 402 on the connection portion side to the third panel 403. These notches 404 are formed at equal distance positions from the connection portion to the third panel 403. The U-shaped case 400 is formed so that the first and third panels and the second and third panels respectively form nearly right angles, the strip group 410 is inserted in that case, and the rubber 420 is hooked on the notches 404, thus maintaining the bundled state of strips (FIGS. 20C and 20D).

The first panel 401 is an upper surface panel that contacts a sequential still image, and the second panel 402 serves as a backbone. The first and second panels 401 and 402 have a size slightly larger than the strip sheets to be housed. In this manner, a protection function of the strip sheet group 410 is provided.

Figure 22:
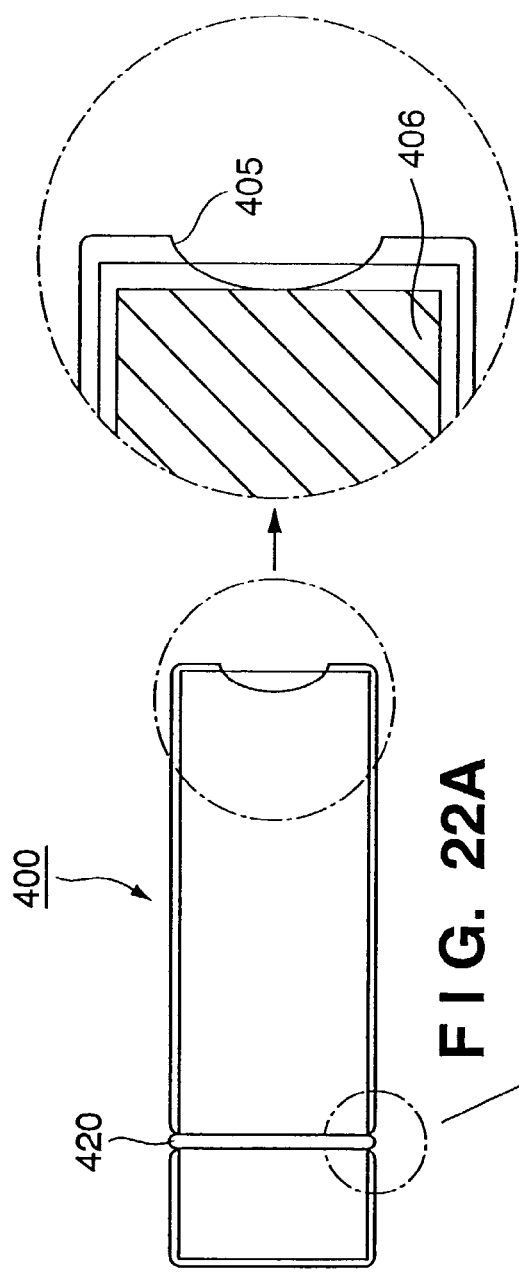
FIGS. 22A to 22C show the structure of notches in the case according to the embodiment of the present invention.

When the first panel 401 serving as the upper surface panel is larger than the strip sheets to be housed, first several strip sheets may be flipped at the same time. Hence, in this embodiment, a notch 405 is formed to expose housed strips, as shown in FIG. 22 and the like, so that the finger contacts the first strip sheet upon sequentially flipping the sheets. In this way, the strip sheets can be reliably flipped one by one in turn from the first one. The width of the notch 405 is determined so that the user's finger (thumb) can touch the strip and the user can naturally flip strips. Note that the shape of the notch is not limited to an arcuated shape.

When a frame is formed around a sequential still image on each strip sheet, the width of the notch may be determined so that only this frame portion exposes (FIG. 22B). In this manner, the sequential still image itself does not expose, and can be reliably protected.

The second panel 402 serves as a backbone, and preferably has a size slightly larger than the strip sheets in the same manner as the first panel 401. Since such second panel 402 is formed, it can reliably protect strip sheets, and allows the user to easily flip strip sheets one by one until the last page upon sequentially flipping them. More specifically, when no second panel 402 is formed or when the second panel 402 is smaller than strip sheets, last several pages are flipped at the same time, and the user cannot normally observe a flip moving image. However, according to this embodiment, since the second panel is provided, the user can easily and reliably flip strip sheets one by one until the last page.

Also, the aforementioned notches 404 preferably have a depth that allows housed strips to slightly expose, as shown in FIG. 22C. When the notches 404 are formed in this way, they can prevent the rubber band 420 from being displaced, and the rubber band 420 can contact strip sheets, thus maintaining the housed state of the strip sheet group 410 more satisfactorily and effectively. Also, the holding mechanism using the rubber band according to this embodiment can provide a holding means that effectively holds the strip group 410 by a very simple structure. When the strip sheet group is directly clamped by a paper clip or the like, the strip sheets may be damaged by the paper clip. However, according to this embodiment, since the rubber band 420 is hooked while the strip sheets are protected by the case, the strip sheets can be prevented from being damaged.

Figure 24:
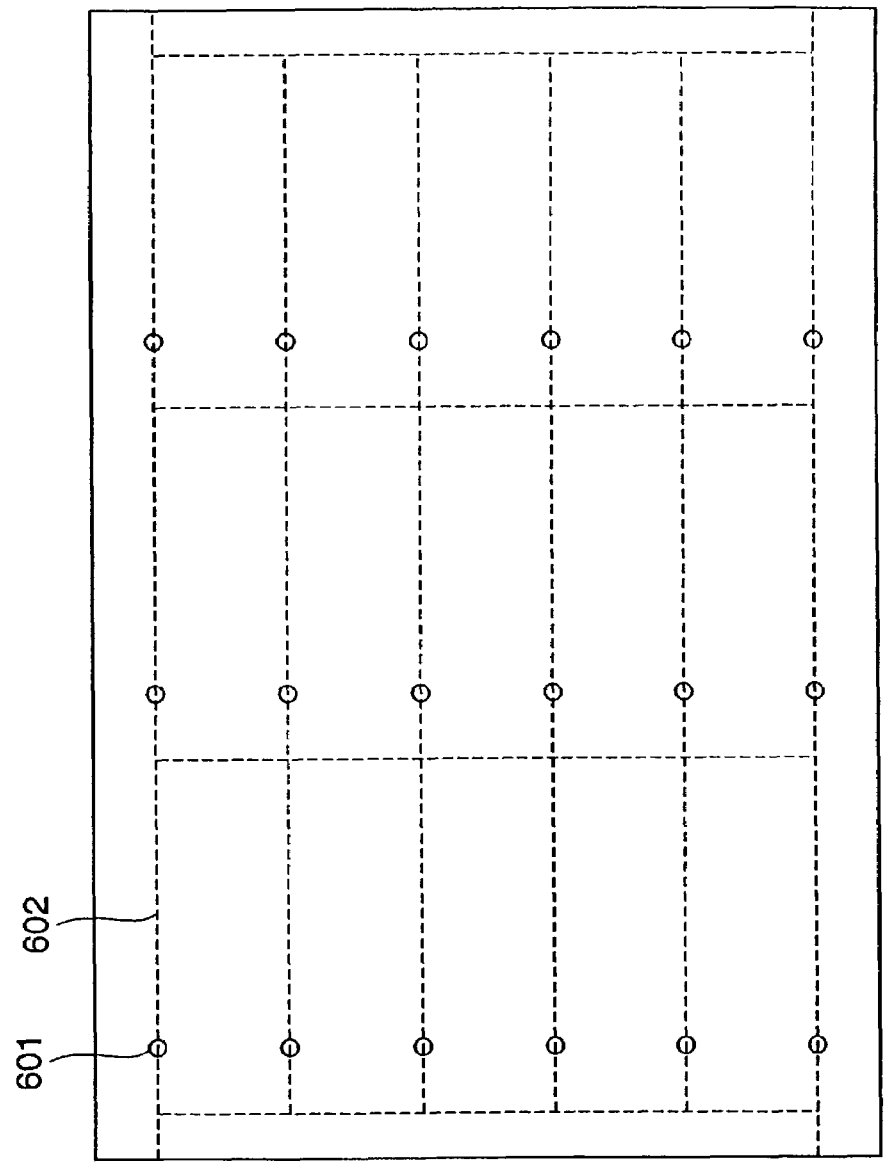
FIG. 24 shows another paper sheet used to print sequential still images in the embodiment of the present invention.
Figure 25:
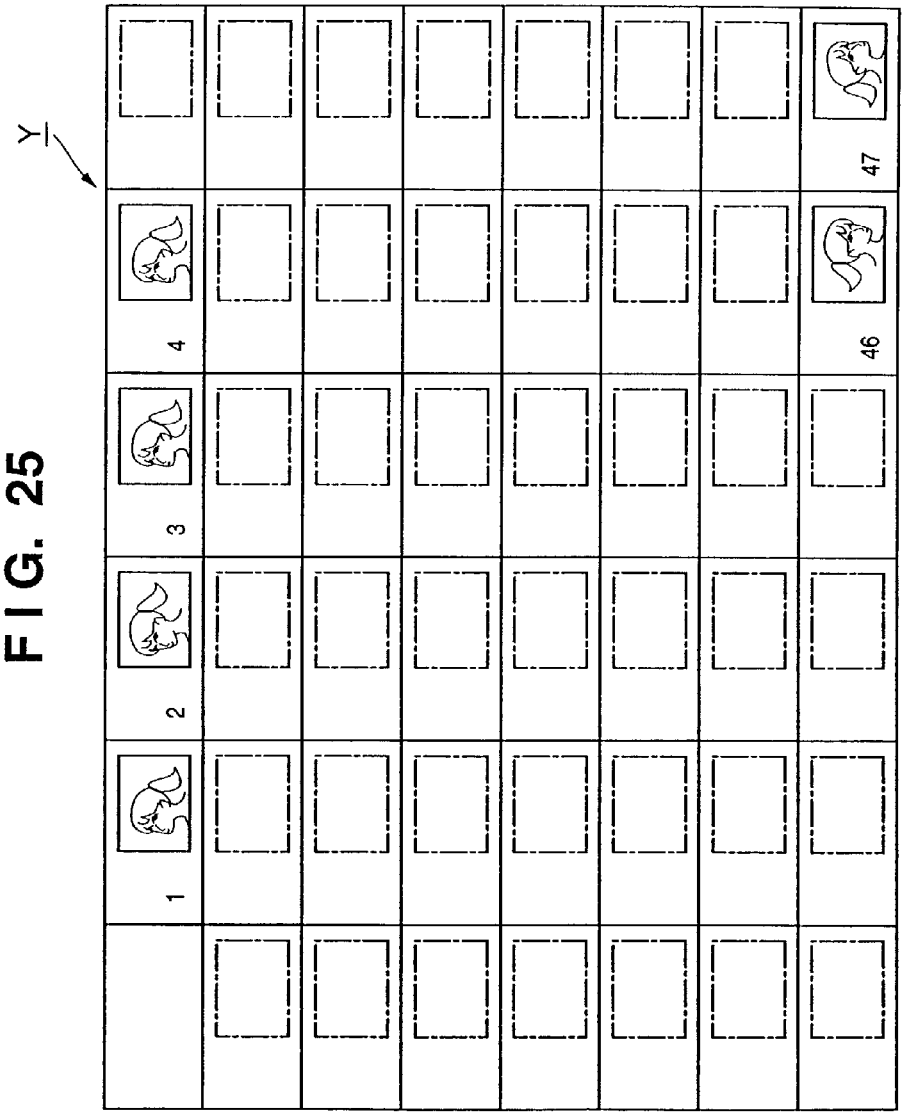
FIG. 25 shows a printout of sequential still images in the prior art.

Note that notches may also be formed on each strip sheet at positions corresponding to the notches 404 when the sheets are housed in the case member 400. Such notches can be formed by providing a paper sheet, as shown in, e.g., FIG. 24. This paper sheet is formed with holes 601 used to form notches on perforations 602. With such structure, the rubber band 420 fits on the notches 404 of the case member and the notches 601 of respective strip sheets, thus holding the housed strip sheets more reliably.

Also, a plurality of sets of notches may be formed to bundle sheets using a plurality of rubber bands.

In the above embodiment, the U-shaped case is formed using the first to third panels. However, since strip sheets are to be maintained in a bundled state so as to protect the strip sheets and to allow to observe a flip moving image, the third panel 403 may be omitted. However, as described in the above embodiment, when the case is formed using the first to third panels, there are some merits, i.e., the case member 400 can be formed by a single sheet, the third panel can align a bundle of strip sheets as a backbone, and so forth.

[Another Embodiment]

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

As described above, according to the present invention, since sequential still images are obtained by extracting a predetermined number of images from a desired range of a moving image, and are sequentially displayed to allow the user to preview a flip moving image prior to a printout process, a flip moving image that can flexibly meet user's requirements can be provided.

Also, according to the present invention, since the desired range of the moving image can be re-set immediately after a preview process for sequentially displaying the obtained sequential still images, the operability can be further improved.

According to the present invention, a predetermined number of sequential still images can be acquired from a desired range of a moving image irrespective of the duration of the designated desired range. Hence, the user can designate the desired range without minding if a predetermined number of sequential still images can be acquired.

As many apparently widely different embodiments of the present invention can be made without departing from the spirit and scope thereof, it is to be understood that the invention is not limited to the specific embodiments thereof except as defined in the claims.

What is claimed is:

1. An image processing apparatus for controlling to print continuous plural still images, which can be observed as a flip moving image, on the basis of moving image data, comprising:

a designation unit adapted to designate a desired range of the moving image data;

an acquiring unit adapted to acquire the number of frames included in the desired range of the moving image and a predetermined setup number indicating the number of still images to be included in the continuous plural still images;

a determining unit adapted to determine whether or not the number of frames acquired by said acquiring unit is equal to or greater than the predetermined setup number;

a first generation unit adapted to, when said determining unit determines that the number of frames is equal to or greater than the predetermined setup number, generate the continuous plural still images including the predetermined setup number of still images by automatically extracting the predetermined setup number of frames from the desired range; and a second generation unit adapted to, when said determining unit determines that the number of frames is less than the predetermined setup number, automatically generate the continuous plural still images including the predetermined setup number of still images by extracting all frames from the desired range, and complementing deficient frames by repetitively using identical frames, and wherein said second generation unit repetitively uses the first frame of the desired range of the moving image to complement deficient frames, and applies a fade-in effect to the still images obtained by repetitively using the first frame.

2. An image processing apparatus for controlling to print continuous plural still images, which can be observed as a flip moving image, on the basis of moving image data, comprising:

a designation unit adapted to designate a desired range of the moving image data;

an acquiring unit adapted to acquire the number of frames included in the desired range of the moving image and a predetermined setup number indicating the number of still images to be included in the continuous plural still images;

a determining unit adapted to determine whether or not the number of frames acquired by said acquiring unit is equal to or greater than the predetermined setup number;

a first generation unit adapted to, when said determining unit determines that the number of frames is equal to or greater than the predetermined setup number, generate the continuous still images including the predetermined setup number of still images by automatically extracting the predetermined setup number of frames from the desired range; and a second generation unit adapted to, when said determining unit determines that the number of frames is less than the predetermined setup number, automatically generate the continuous still images including the predetermined setup number of frames by extracting all frames from the desired range, and complementing deficient frames by repetitively using identical frames, and wherein said second generation unit repetitively uses the last frame of the desired range of the moving image to complement deficient frames, and applies a fade-out effect to the still images obtained by repetitively using the last frame.

3. An image processing method for controlling to print continuous plural still images, which can be observed as a flip moving image, on the basis of moving image data, comprising:

a designation step of designating a desired range of the moving image data;

an acquiring step of acquiring the number of frames included in the desired range of the moving image and a predetermined setup number indicating the number of still images to be included in the continuous plural still images;

a determining step of determining whether or not the number of frames acquired in said acquiring step is equal to or greater than the predetermined setup number;

a first generation step of generating, when it is determined in the determining step that the number of frames is equal to or greater than the predetermined setup number, the continuous plural still images including the predetermined setup number of still images by automatically extracting the predetermined setup number of frames from the desired range; and a second generation step of automatically generating, when it is determined in the determining step that the number of frames is less than the predetermined setup number, the continuous plural still images including the predetermined setup number of still images by extracting all frames from the desired range, and complementing deficient frames by repetitively using identical frames, and wherein the second generation step includes the step of repetitively using the first frame of the desired range of the moving image to complement deficient frames, and applying a fade-in effect to the still images obtained by repetitively using the first frame.

4. An image processing method for controlling to print continuous plural still images, which can be observed as a flip moving image, on the basis of moving image data, comprising:

a designation step of designating a desired range of the moving image data;

an acquiring step of acquiring the number of frames included in the desired range of the moving image and a predetermined setup number indicating the number of still images to be included in the continuous plural still images;

a determining step of determining whether or not the number of frames acquired in said acquiring step is equal to or greater than the predetermined setup number;

a first generation step of generating, when it is determined in the determining step that the number of frames is equal to or greater than the predetermined setup number, the continuous still images including the predetermined setup number of still images by automatically extracting the predetermined number of frames from the desired range; and a second generation step of automatically generating, when it is determined in the determining step that the number of frames is less than the predetermined setup number, the continuous still images including the predetermined setup number of frames by extracting all frames from the desired range, and complementing deficient frames by repetitively using identical frames, and wherein the second generation step includes the step of repetitively using the last frame of the desired range of the moving image to complement deficient frames, and applying a fade-out effect to the still images obtained by repetitively using the last frame.

5. A printing apparatus for printing continuous plural still images, which can be observed as a flip moving image, on the basis of moving image data, comprising:

a designation unit adapted to designate a desired range of the moving image data;

an acquiring unit adapted to acquire the number of frames included in the desired range of the moving image and a predetermined setup number indicating the number of still images to be included in the continuous plural still images;

a determining unit adapted to determine whether or not the number of frames acquired by said acquiring unit is equal to or greater than the predetermined setup number;

a first generation unit adapted to, when said determining unit determines that the number of frames is equal to or greater than the predetermined setup number, generate the continuous plural still images including the predetermined setup number of still images by automatically extracting the predetermined setup number of frames from the desired range;

a second generation unit adapted to, when said determining unit determines that the number of frames is less than the predetermined setup number, automatically generate the continuous plural still images including the predetermined setup number of still images by extracting all frames from the desired range, and complementing deficient frames by repetitively using identical frames; and printing means for printing the predetermined setup number of continuous plural still images generated by said first or second generation unit, and wherein said second generation unit repetitively uses the first frame of the desired range of the moving image to complement deficient frames, and applies a fade-in effect to the still images obtained by repetitively using the first frame.

6. A printing apparatus for printing continuous plural still images, which can be observed as a flip moving image, on the basis of moving image data, comprising:

a designation unit adapted to designate a desired range of the moving image data;

an acquiring unit adapted to acquire the number of frames included in the desired range of the moving image and a predetermined setup number indicating the number of still images to be included in the continuous plural still images;

a determining unit adapted to determine whether or not the number of frames acquired by said acquiring unit is equal to or greater than the predetermined setup number;

a first generation unit adapted to, when said determining unit determines that the number of frames is equal to or greater than the predetermined setup number, generate the continuous still images including the predetermined setup number of still images by automatically extracting the predetermined setup number of frames from the desired range;

a second generation unit adapted to, when said determining unit determines that the number of frames is less than the predetermined setup number, automatically generate the continuous still images including the predetermined setup number of frames by extracting all frames from the desired range, and complementing deficient frames by repetitively using identical frames; and printing means for printing the predetermined setup number of continuous plural still images generated by said first or second generation unit, and wherein said second generation unit repetitively uses the last frame of the desired range of the moving image to complement deficient frames, and applies a fade-out effect to the still images obtained by repetitively using the last frame.

7. A computer readable memory that stores a control program for making a computer execute an image processing method for controlling to print a continuous plural still images, which can be observed as a flip moving image, on the basis of moving image data, said image processing method comprising:

a designation step of designating a desired range of the moving image data;

an acquiring step of acquiring the number of frames included in the desired range of the moving image and a predetermined setup number indicating the number of still images to be included in the continuous plural still images;

a determining step of determining whether or not the number of frames acquired in said acquiring step is equal to or greater than the predetermined setup number;

a first generation step of generating, when it is determined in the determining step that the number of frames is equal to or greater than the predetermined setup number, the continuous plural still images including the predetermined setup number of still images by automatically extracting the predetermined setup number of frames from the desired range; and a second generation step of automatically generating, when it is determined in the determining step that the number of frames is less than the predetermined setup number, the continuous plural still images including the predetermined setup number of still images by extracting all frames from the desired range, and complementing deficient frames by repetitively using identical frames, and wherein the second generation step includes the step of repetitively using the first frame of the desired range of the moving image to complement deficient frames, and applying a fade-in effect to the still images obtained by repetitively using the first frame.

8. A computer readable memory that stores a control program for making a computer execute an image processing method for controlling to print continuous plural still images, which can be observed as a flip moving image, on the basis of moving image data, said image processing method comprising:

a designation step of designating a desired range of the moving image data;

an acquiring step of acquiring the number of frames included in the desired range of the moving image and a predetermined setup number indicating the number of still images to be included in the plural still images;

a determining step of determining whether or not the number of frames acquired in said acquiring step is equal to or greater than the predetermined setup number;

a first generation step of generating, when it is determined in the determining step that the number of frames is equal to or greater than the predetermined setup number, the continuous still images including the predetermined setup number of still images by automatically extracting the predetermined number of frames from the desired range; and a second generation step of automatically generating, when it is determined in the determining step that the number of frames is less than the predetermined setup number, the continuous still images including the predetermined setup number of frames by extracting all frames from the desired range, and complementing deficient frames by repetitively using identical frames, and wherein the second generation step includes the step of repetitively using the last frame of the desired range of the moving image to complement deficient frames, and applying a fade-out effect to the still images obtained by repetitively using the last frame.

* * * * *